US 8,286,218 B2

(12) United States Patent
Pizzurro et al.

(10) Patent No.: US 8,286,218 B2
(45) Date of Patent: Oct. 9, 2012

(54) SYSTEMS AND METHODS OF CUSTOMIZED TELEVISION PROGRAMMING OVER THE INTERNET

(75) Inventors: Alfred J. Pizzurro, Laguna Niguel, CA (US); Christopher John Falson, Studio City, CA (US)

(73) Assignee: AJP Enterprises, LLC, Laguna Niguel, CA (US)

( * ) Notice: Subject to any disclaimer, the term of this patent is extended or adjusted under 35 U.S.C. 154(b) by 595 days.

(21) Appl. No.: 11/759,759

(22) Filed: Jun. 7, 2007

(65) Prior Publication Data

US 2007/0288978 A1 Dec. 13, 2007

Related U.S. Application Data

(60) Provisional application No. 60/811,833, filed on Jun. 8, 2006, provisional application No. 60/849,207, filed on Oct. 4, 2006, provisional application No. 60/857,269, filed on Nov. 7, 2006, provisional application No. 60/888,473, filed on Feb. 6, 2007.

(51) Int. Cl.
 *H04N 7/08* (2006.01)
(52) U.S. Cl. ............... 725/135; 725/24; 725/32; 705/14
(58) Field of Classification Search .................... 725/32, 725/34–38, 42, 44, 46–49, 59–61, 109–112, 725/24, 135; 715/723–726; 348/722
See application file for complete search history.

(56) References Cited

U.S. PATENT DOCUMENTS

| | | | |
|---|---|---|---|
| 4,965,819 A | 10/1990 | Kannes | |
| 5,544,313 A | 8/1996 | Shachnai et al. | |
| 5,544,327 A | 8/1996 | Dan et al. | |
| 5,608,448 A | 3/1997 | Smoral et al. | |

(Continued)

FOREIGN PATENT DOCUMENTS

EP 1021036 A 8/2000

(Continued)

OTHER PUBLICATIONS

International Search Report dated Jan. 22, 2008, Application No. PCT/US07/13488.

(Continued)

*Primary Examiner* — Vivek Srivastava
*Assistant Examiner* — Aklil Tesfaye
(74) *Attorney, Agent, or Firm* — Knobbe, Martens, Olson & Bear, LLP

(57) ABSTRACT

A production facility receives program content from a plurality of broadcast feeds over the Internet. In an embodiment, the production facility comprises server on a computer network, such as the Internet. The server comprises computer programs configured to manipulate the audio and video data of the multiple program contents. At the production facility, the program content can be manipulated to produce a production. Program manipulation can comprise at least one of green screen technology, music, graphics, Foley, sound effects, voice over, advertising, or the like. The production is broadcast over the computer network to viewers, where the viewers receive the production. In an embodiment, the production is customized based on the viewers' input received while broadcasting. In other words, the production is customized in real time based at least in part on the interaction of the production with the viewers. In another embodiment, the viewers can further manipulate the program content of the production to create a new production, which can be broadcast over the customized programming system.

16 Claims, 9 Drawing Sheets

U.S. PATENT DOCUMENTS

| | | | |
|---|---|---|---|
| 5,774,668 A | 6/1998 | Choquier | |
| 5,861,881 A | 1/1999 | Freeman | |
| 6,009,410 A | 12/1999 | Lemole et al. | |
| 6,041,343 A | 3/2000 | Nguyen et al. | |
| 6,185,369 B1 | 2/2001 | Ko et al. | |
| 6,463,468 B1 | 10/2002 | Buch et al. | |
| 6,564,380 B1 | 5/2003 | Murphy | |
| 6,601,084 B1 | 7/2003 | Bhaskaran et al. | |
| 6,674,459 B2 | 1/2004 | Ben-Shachar et al. | |
| 6,760,916 B2 | 7/2004 | Holtz et al. | |
| 6,947,966 B1* | 9/2005 | Oko et al. | 709/203 |
| 6,970,937 B1 | 11/2005 | Huntington | |
| 7,079,176 B1 | 7/2006 | Freeman et al. | |
| 2001/0013123 A1* | 8/2001 | Freeman et al. | 725/34 |
| 2001/0023436 A1 | 9/2001 | Srinivasan et al. | |
| 2002/0040479 A1 | 4/2002 | Ehrman et al. | |
| 2002/0049974 A1 | 4/2002 | Shnier | |
| 2002/0049977 A1 | 4/2002 | Miller et al. | |
| 2002/0049979 A1 | 4/2002 | White et al. | |
| 2002/0053078 A1 | 5/2002 | Holtz et al. | |
| 2002/0078174 A1 | 6/2002 | Sin et al. | |
| 2002/0116320 A1 | 8/2002 | Nassiri | |
| 2002/0143959 A1 | 10/2002 | El-Baze et al. | |
| 2002/0170067 A1 | 11/2002 | Norstrom et al. | |
| 2002/0188943 A1 | 12/2002 | Freeman et al. | |
| 2003/0013526 A1 | 1/2003 | Galyean et al. | |
| 2003/0016630 A1 | 1/2003 | Vegas-Garcia et al. | |
| 2003/0033157 A1* | 2/2003 | Dempski et al. | 705/1 |
| 2003/0115589 A1 | 6/2003 | D'Souza et al. | |
| 2003/0122966 A1* | 7/2003 | Markman et al. | 348/563 |
| 2003/0182428 A1 | 9/2003 | Li et al. | |
| 2003/0189668 A1 | 10/2003 | Newman et al. | |
| 2004/0054781 A1 | 3/2004 | Chen et al. | |
| 2004/0073953 A1 | 4/2004 | Xu et al. | |
| 2004/0172399 A1 | 9/2004 | Saffre | |
| 2004/0216164 A1 | 10/2004 | Hayhurst | |
| 2004/0261127 A1* | 12/2004 | Freeman et al. | 725/135 |
| 2005/0001903 A1* | 1/2005 | Endler et al. | 348/207.1 |
| 2005/0055718 A1 | 3/2005 | Stone | |
| 2005/0071884 A1 | 3/2005 | Champel et al. | |
| 2005/0091155 A1* | 4/2005 | Pokta | 705/40 |
| 2005/0111662 A1* | 5/2005 | Fiedler | 380/201 |
| 2005/0132420 A1* | 6/2005 | Howard et al. | 725/135 |
| 2005/0135366 A1 | 6/2005 | Trappeniers et al. | |
| 2005/0149988 A1 | 7/2005 | Grannan | |
| 2005/0183120 A1 | 8/2005 | Jain et al. | |
| 2005/0262245 A1 | 11/2005 | Menon et al. | |
| 2005/0283395 A1 | 12/2005 | Lesandrini et al. | |
| 2006/0242663 A1 | 10/2006 | Gogerty | |
| 2006/0259923 A1* | 11/2006 | Chiu | 725/24 |
| 2006/0272028 A1 | 11/2006 | Maes | |
| 2006/0294561 A1 | 12/2006 | Grannan et al. | |
| 2007/0022446 A1 | 1/2007 | Urseneau et al. | |
| 2007/0050828 A1 | 3/2007 | Renzi et al. | |
| 2007/0088817 A1 | 4/2007 | Li | |
| 2007/0220173 A1 | 9/2007 | Ohga et al. | |
| 2007/0239542 A1 | 10/2007 | Shapiro | |
| 2008/0063287 A1 | 3/2008 | Klamer et al. | |
| 2008/0155588 A1 | 6/2008 | Roberts et al. | |

FOREIGN PATENT DOCUMENTS

| | | |
|---|---|---|
| JP | 2006216078 | 8/2002 |
| KR | 2002069875 | 5/2002 |
| WO | WO9729458 A | 9/1997 |
| WO | WO0042773 A | 7/2000 |
| WO | WO0147262 | 6/2001 |
| WO | WO 2005062572 A | 7/2005 |
| WO | WO 2005091585 | 9/2005 |
| WO | WO 2005101411 | 10/2005 |

OTHER PUBLICATIONS

International Search Report dated Sep. 15, 2009, Application No. PCT/US 09/39195.

Written Opinion of the International Searching Authority dated Sep. 15, 2009, Application No. PCT/US 09/39195.

* cited by examiner

SYSTEMS AND METHODS OF CUSTOMIZED TELEVISION PROGRAMMING OVER THE INTERNET

This application claims the benefit of priority under 35 U.S.C. §119(e) of U.S. Provisional Application No. 60/811,833, filed on Jun. 8, 2006 and titled SYSTEMS AND METHODS OF CUSTOMIZED TELEVISION PROGRAMMING OVER THE INTERNET; U.S. Provisional Application No. 60/849,207, filed on Oct. 4, 2006 and titled SYSTEMS AND METHODS OF CUSTOMIZED TELEVISION PROGRAMMING OVER THE INTERNET; U.S. Provisional Application No. 60/857,269, filed on Nov. 7, 2006 and titled SYSTEMS AND METHODS OF CUSTOMIZED TELEVISION PROGRAMMING; and U.S. Provisional Application No. 60/888,473, filed on Feb. 6, 2007 and titled INTERACTIVE BROADCAST PROCESS, the entirety of which are incorporated herein by reference.

BACKGROUND OF THE INVENTION

1. Field of the Invention

The present invention relates in general to an interactive broadcast system and method, and more particularly to manipulating content received over the Internet to create customized programming and broadcasting the customized programming over the Internet to viewers.

2. Description of the Related Art

Traditional television programming relies on program content being generated in the broadcast studio or received from a communications satellite, microwave link, landline, or cable from a remote mobile production unit. Producers at a single studio location manipulate the program content to produce television programs, which are broadcast to the viewing audience. The television programs are not customized in real time to a particular audience at the time of the broadcast based on viewer input received at the time of the broadcast. Further, television programs are not produced by multiple producers who are geographically dispersed and/or addressing disparate audiences.

SUMMARY OF THE INVENTION

The interactive television system allows multiple broadcasters to share programming with other broadcasters, producers, directors, or artists for distribution to viewers over a broadband and/or peer-to-peer networks.

In an embodiment of the invention, a production facility receives program content from a plurality of broadcast feeds over the Internet. In an embodiment, the production facility comprises a server on a computer network, such as the Internet. The server comprises computer programs configured to manipulate the audio and video data of the multiple program contents. At the production facility, the program content can be manipulated to produce a production. In an embodiment, the production facility comprises multiple production facilities. Program manipulation comprises at least one of live interaction of multiple feeds, green screen technology, music, graphics, Foley, sound effects, voice over, advertising, and the like. The production is broadcast over the computer network to viewers, where the viewers receive the production. In an embodiment, the production is customized based on the viewers' input received while broadcasting. In other words, the production is customized in real time based at least in part on the interaction of the production with the viewers. In another embodiment, the viewers can further manipulate the program content of the production to create a new production, which can be broadcast over the computer network. In yet another embodiment, a second producer can further manipulate the program content of the production to create a new production.

In an embodiment, a method of producing interactive television comprises receiving over the Internet a plurality of programming content, where the plurality of programming content is received from multiple sources, receiving over the Internet viewer input, manipulating the programming content based at least in part on the viewer input to create a customized production, where the manipulation occurs in real time as the viewer input is received, and transmitting the customized production over the Internet to at least one viewer.

In another embodiment, an interactive television network comprises a plurality of programming content, where the plurality of programming content is provided by a plurality of content providers, a production facility that receives the plurality of programming content from the Internet, where the production facility manipulates the programming content to create a production, and viewer input received over the Internet at the production facility, where the production is customized based at least in part on the viewer input substantially at the time the production facility receives the viewer input.

In a further embodiment, a computer program for producing interactive television comprises computer code stored on computer-readable media configured to receive programming content from multiple sources over the Internet, computer code stored on computer-readable media configured to receive viewer input from viewers over the Internet, computer code stored on computer-readable media configured to manipulate the programming content based at least in part of the viewer input to create a customized production, where the customized production is created substantially when the viewer input is received, and computer code stored on computer-readable media configured to transmit the customized production over the Internet to the viewers.

In yet a further embodiment, a method of producing interactive television comprises receiving over the Internet a plurality of programming content. The plurality of programming content is received from multiple sources. The method further comprises receiving over the Internet viewer input, manipulating the programming content to create a customized production, where the manipulation occurs in real time, and transmitting the customized production over the Internet to at least one viewer.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

DETAILED DESCRIPTION OF THE PREFERRED EMBODIMENT

Figure 1:
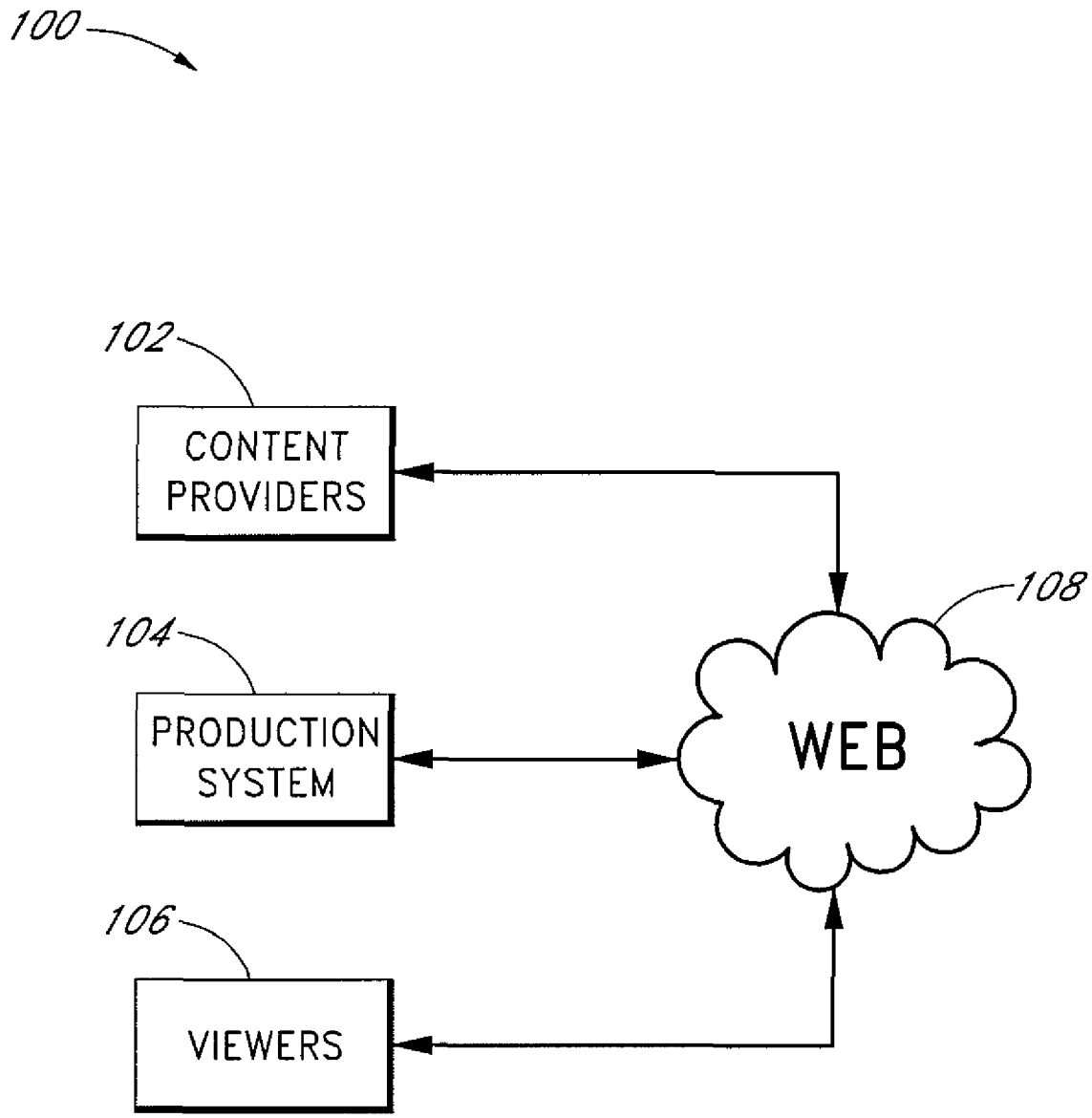
FIG. 1 is a block diagram of an interactive television programming system, according to an embodiment of the invention.

FIG. 1 is a block diagram of an interactive television programming system 100, according to an embodiment of the invention. The interactive television programming system 100 comprises a plurality of content providers 102, a production system 104, and at least one viewer 106. The content providers 102 transmit a plurality of audio, visual, or audio-visual content to the production system 104 through a communication medium 108. In an embodiment, the content comprises streaming media, streaming video, streaming audio, streaming audio and video, and the like.

The production system 104 receives the plurality of content from content providers 102 through the communication medium 108 and manipulates the content to produce a production. In an embodiment, the production system 104 can manipulate the content by editing, adding, deleting, or changing music, commentary, graphics, sound effects (Foley), advertisements, video, and the like. In another embodiment, the production system 104 can manipulate the content using keying technology, holographic technology, and the like.

The production system 104 transmits or broadcasts the production through the communication medium 108 to the viewers 106. In an embodiment, the production system 104 also transmits the production through the communication medium 108 to the content providers 102. In an embodiment, the production comprises at least one of streaming media, streaming video, streaming audio, streaming audio and video, and the like.

Focusing now on the communication medium 108, in one embodiment, the communication medium is the Internet, which is a global network of computers. In other embodiments, the communication medium 108 can be any communication system including by way of example, dedicated communication lines, telephone networks, wireless data transmission systems, two-way cable systems, customized computer networks, interactive kiosk networks, interactive television networks, and the like.

The viewers 106 receive the production from the production system 104 through the communication medium 108. In an embodiment, the viewers send viewer input to the production system 104 and/or the content providers 102 through the communication medium 108.

Figure 2:
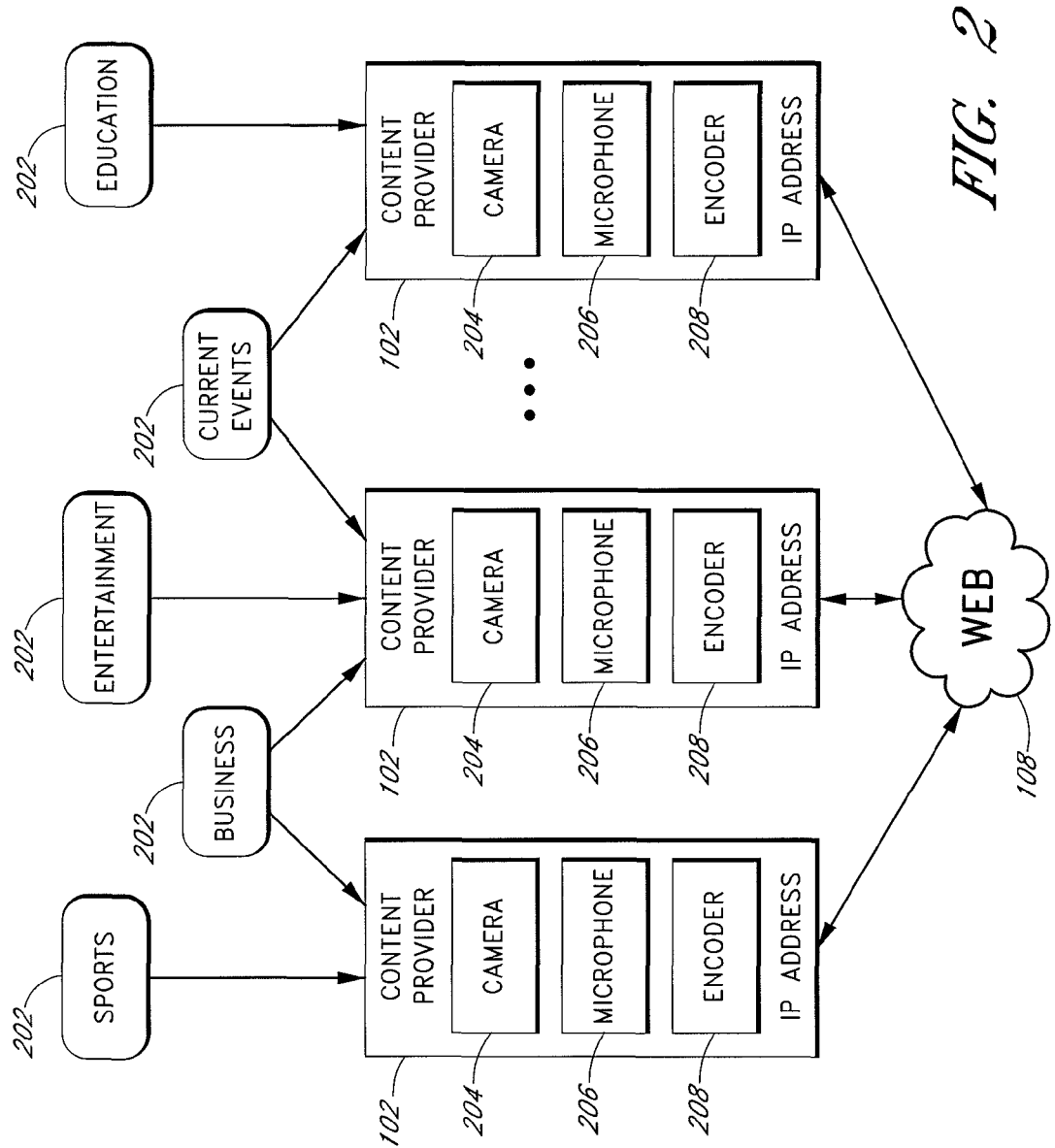
FIG. 2 is a block diagram illustrating content providers and examples of content of the interactive television programming system, according to an embodiment of the invention.

FIG. 2 is a block diagram illustrating an embodiment of the plurality of content providers 102, where each content provider 102 comprises an audio-visual recorder comprising at least one of a video recorder 204 and a microphone or other audio source 206. The content provider 102 further comprises an encoder 208. In another embodiment, the content provider 102 further comprises pre-recorded audio-visual elements, such as video, photographs, music, and the like.

The content provider 102 captures events 202 using the audio-visual recorder to create content. Examples of audio-visual recorders include, but are not limited to digital cameras, cell phones, personal digital assistants, computers, laptop computers, microphones, open source software recording systems, web 2.0 software based recording systems, digital workstations, multi-track recorders, tape machines, and film cameras. To enhance the recording procedure, producers may use digital converters, sound and audio cards, preamps, mixing consoles, signal processors, midi sequencers, speaker systems, turntables, recording, editing and animation software, and the like.

The events 202 can be sports, business, entertainment, education, current events, and the like. For example, the content provider 102 can record a football game, a high school track meet, an auction, court proceedings, or the like, along with the associated audio. Examples of business events include a meeting, a conference call, a sales seminar, and the like. Other examples of content comprise a concert, a music school's recital, breaking news, interviews, a lecture, a teacher teaching a class or demonstrating a skill, and the like.

In an embodiment, the encoder 208 receives the output of the camera/video recorder 204 and the output of the microphone 206 and encodes the information for transmission through the communication medium 108 to the production system 104. In an embodiment, the encoder comprises a 2-way encoder, which permits the content provider 102 to send and receive content.

In another embodiment, the encoder 208 comprises a software based encoder, such as Microsoft Windows Media Encoder 9.0, and the like. The software based encoder 208 runs on a computer and connects to the communication medium 108 through the computer.

In yet another embodiment, the encoder 208 comprises a hardware based encoder, such as DSP Research Models DS-400xHI, DS-400xHCI, DB-1004C, and DS-80xxHI, VBrick Systems, Inc. Models 9110-6200, 9110-4200, 9110-4300, 9110-5200, 9110-5300, 9130-4300, 9130-6200, 9170-4200, 9190-4200, and 9190-4300, and the like. The hardware based encoder 208 connects to a computer and then to the communication medium 108 through the computer, or connects directly to the communication medium 108 using the encoder's unique Internet Protocol address.

In an embodiment, the content provider 102 further comprises an Internet Protocol (IP) address that identifies the content provider 102 for transmitting and receiving the communications through the communication medium 108. An Internet Protocol address is a unique address that devices use in order to identify and communicate with each other on a computer network utilizing the Internet Protocol standard. Any participating network device, such as routers, computers, time-servers, printers, Internet fax machines, telephones, mobile phone, personal digital assistants, wireless handheld devices, smart phone, and the like comprises a unique IP address.

An IP address can also be thought of as the equivalent of a street address or a phone number for a computer or other network device on the Internet. Just as each street address and phone number uniquely identifies a building or telephone, an IP address can uniquely identify a specific computer or other network device on a network. In addition, an IP address is associated with user information.

Figure 3:
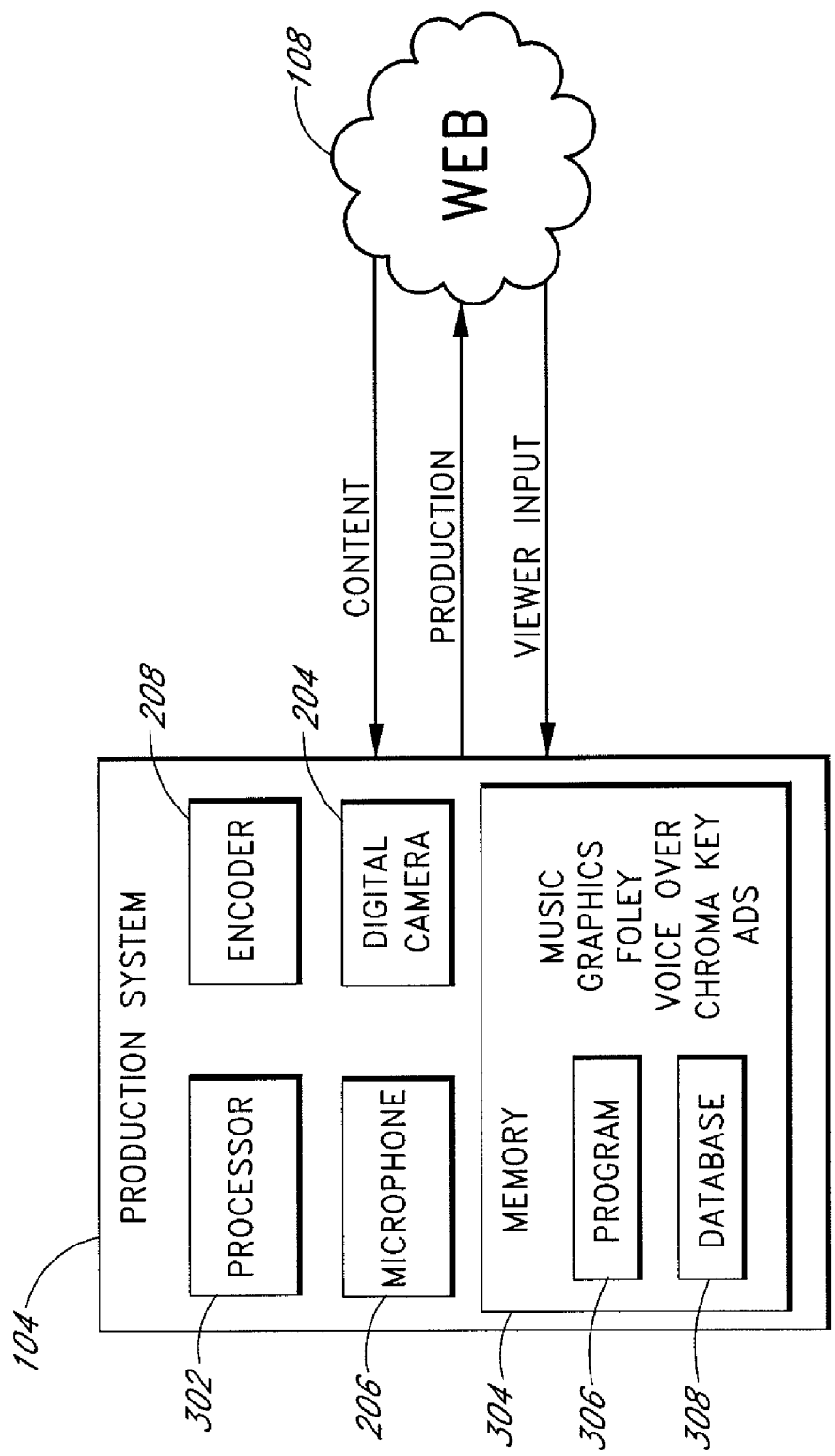
FIG. 3 is a block diagram of the production system of the interactive television programming system, according to an embodiment of the invention.

FIG. 3 is a block diagram of the production system 104 of the interactive television programming system 100, according to an embodiment of the invention. The production system 104 comprises a processor 302 and memory 304. The processor 302 executing program logic 306 allows the production system 104 to manipulate the content received from the content providers 102. In one embodiment, the processor 302 is a computer, which is equipped with a modem, DSL interface, or cable interface. In other embodiments, the processor 302 can be any device that allows the user to interact with the system 100 such as, by way of example, a computer workstation, a local area network of individual computers, a kiosk, a personal digital assistant, an interactive wireless communications device, an interactive television, a cell phone, or the like. In an embodiment, the processor 302 is a server on the Internet.

The processor 302 may comprise one or more computers. The computers comprise, by way of example, processors, program logic, or other substrate configurations representing data and instructions, which operate as described herein. In other embodiments, the processors 302 can comprise controller circuitry, processor circuitry, processors, general-purpose single-chip or multi-chip microprocessors, digital signal processors, embedded microprocessors, microcontrollers and the like.

The memory 304 comprises the program logic 306 and database 308. In one embodiment, the program logic 306 may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

The database 308 comprises data used by processor 302 executing the program logic 306 to manipulate the content to produce the production. In an embodiment, the database 308 comprises audio, such as music, live or prerecorded, sound effects, such as automated or automatic dialog replacement (ADR) and Foley, graphics, advertisements, keying templates, stored audio and video clips, film stock, synthetic 3-D imagery, animations, backdrops, digital still photographs, text, and the like.

The production system 104 manipulates the program content to produce the program in a variety of ways. In embodiment, a director using the production system 104 manipulates the program content. In another embodiment, the content provider 102 comprises the production system 104. Examples of manipulation include, but are not limited to, adding sound effects (ADR, Foley), music, commentary, graphics, subtitles, language translation, animation, digital and analog special effects, visual special effects, computer generated imagery (CGI), color grading; editing the received content; inserting advertisements; compositing; digital compositing (optical effects); performing voice over, digital cinema technology; using keying technology; sound design and sound designers' actions; and the like.

Types of keying technology include, but are not limited to luminance keying, external keying, downstream keying, and chromakeying. Chromakeying, also referred to as green screen technology or blue screen technology, allows multiple presenters, such as commentators, actors, journalists, politicians, athletes, experts in their field, and the like from multiple locations to stream content together. The green screen technology allows the director to place digitally each presenter into one digital setting. To the viewers 106, the presenters appear to be as if they are interacting on the same set.

For example, using chromakey technology, the production system 104 can simulate a panel of commentators within the same set or room, while in actuality, different content providers 102 in different locations are each transmitting one of the panel member's audio and video to the production system 104. In another example, the production system can add music or sound effects to video compiled from more than one content provider 102. In another example, the production system 104 can insert advertisements into the production. By knowing the viewers' Internet Protocol address, the advertisements can be tailored to the individual viewers preferences, based at least in part on the program the viewer 106 selects along with other data compiled on IP addresses through all embodiments herein. Other examples of the production system's ability to manipulate the content are provided in the various embodiments of the interactive television programming system 100 described below.

In an embodiment, the production system 104 further comprises the encoder 208, as described above. In an embodiment, the encoder 208 is a 2-way encoder 208 and the production system 104 sends and receives content and productions through the communication medium.

In another embodiment, the production system 104 further comprises at least one of the camera/video recorder 204 and the microphone or audio device 206, as described above. In an embodiment, the production system 104 provides program content.

Figure 4:
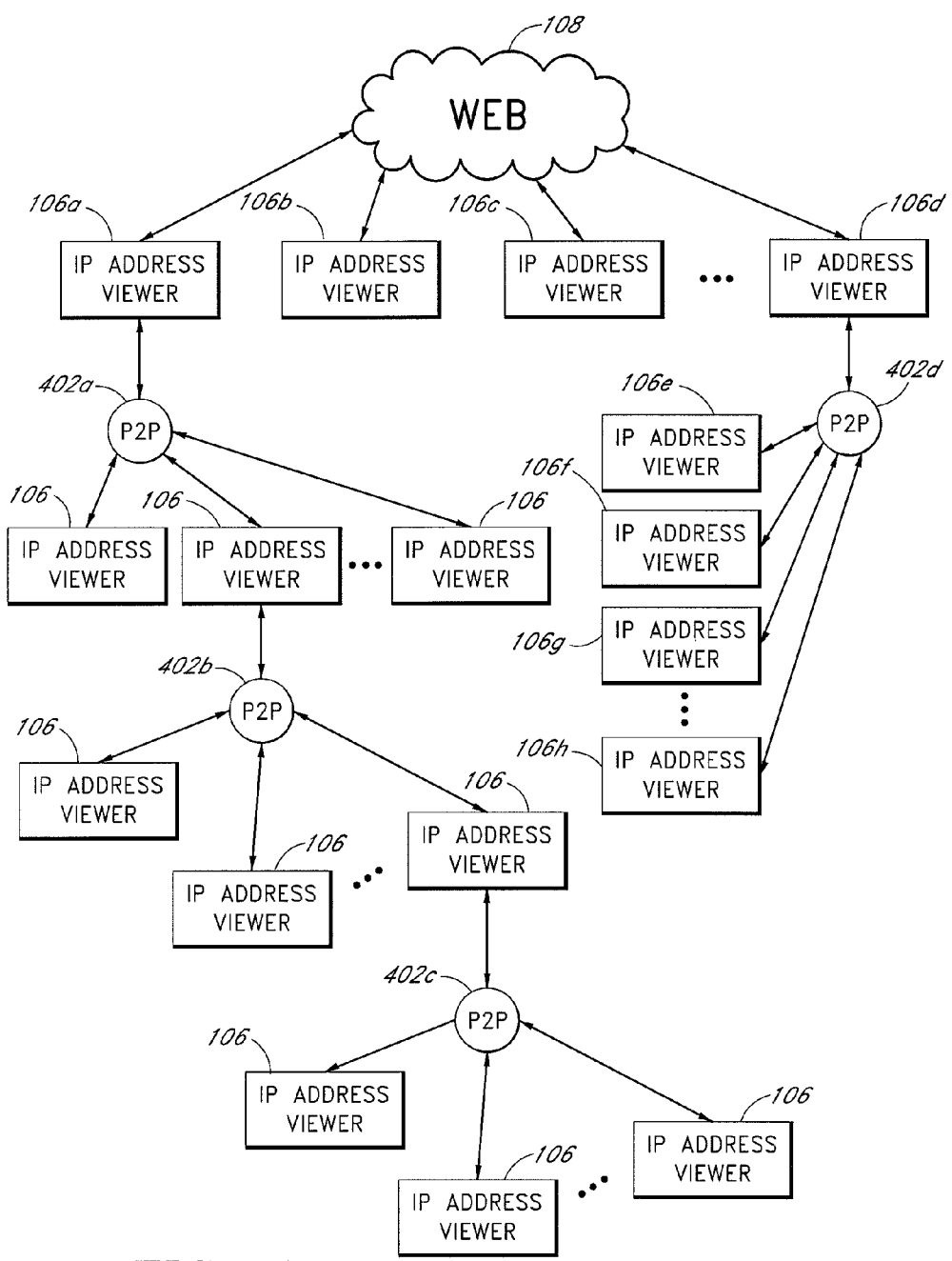
FIG. 4 is a block diagram illustrating viewers of the interactive television system, according to an embodiment of the invention.

FIG. 4 is a block diagram illustrating the viewers 106 of the interactive television programming system 100, according to an embodiment of the invention. The viewers 106 receive the production through the communication medium 108. The viewer 106 comprises an Internet Protocol address that identifies the viewer on communications through the communication medium 108. In an embodiment, the viewers 106 comprise any device capable of interfacing with the Internet, such as, for example, a computer, a laptop, a cell phone, a mobile phone, a Blackberry, a personal digital assistant, digital TV, high definition TV (HD TV), global positioning system (GPS), which can provide locations of each viewer or broadcaster in relationship to an event, camera, production unit, etc., a public broadcasting system in locations such as theaters, malls, stadiums, and the like, a satellite receiver, and the like, The viewer 106 joins the interactive television programming system 100 by logging on to a URL (uniform resource locator) address, according to an embodiment. In another embodiment, the viewer 106 connects to a peer-to-peer stream. Once the viewer 106 is connected to the system 100, the viewer can be offered multiple channels or networks of channels of media streaming. In an embodiment, the channels offer a catalog of live or previously recorded events. In another embodiment, the viewer 106 can view more than one event using multiple or split viewing screens. Once an event is selected, the viewer 106 watches and/or listens to the broadcast in a media player, such as Windows Media, or QuickTime, for example. The broadcast process permits the content and advertising to be modified based at least in part on the viewer's history, preferences, or interaction during the event.

The viewer's Internet Protocol address also permits the viewer 106 to function as a node on a peer-to-peer network 402, according to an embodiment of the invention. As illustrated in FIG. 4, viewers 106b, 106c interface with the communication medium 108 and do not provide a node in a peer-to-peer network 402. Viewer 106d interfaces with the communication medium 108 and provides a node on the peer-to-peer network 402d. Network 402d further interfaces with the plurality of viewers 106e-106h. Further, the viewer 106a interfaces with the communication medium 108, and provides a node in the peer-to-peer network 402a. The peer-to-peer network 402a interfaces with additional viewers 106, which in turn provide additional nodes on additional peer-to-peer networks, such as networks 402b, 402c. Thus, a chain of viewers 106 is created.

In an embodiment, the viewers are interactive viewers 106, such that viewer input from the viewers 106 is transmitted to the production system 104 and/or the content provider 102 through the communication medium 108. In an embodiment, the viewer 106 provides viewer input based at least in part on the production. Viewers 106 provide viewer input by voting, participating in a content survey, talent scouting, sharing the broadcast with friends, recommending or critiquing, responding to advertising, requesting similar programming or elements of programming, such as music, a certain actor, humor, and the like. In the example of a talk show, an expert on the subject or a viewer can be screened and/or approved off the air, as in talk radio, and can be inserted into a broadcast prior to the broadcast being aired. Other examples of viewer input include, but are not limited to editing content for personal use, editing content as part of a new broadcast, adding a new voice over or commentary, inserting text, photos and/or videos to share with friends, interacting with advertising and or advertisers, clicking on an advertisement inside the broadcast and/or making a purchase, recording content for later viewing, becoming part of a live broadcast, and the like. Because the broadcast process allows viewer interaction, the viewer 106 plays a role in the broadcast and/or production process.

In an embodiment, the viewer 106 transmits the viewer input to the production system 104. In another embodiment, the viewer 106 transmits the viewer input to the content provider 102. In an embodiment, the production system 104 manipulates the program based at least in part on the viewer input. In another embodiment, the content provider 106 changes the programming content based at least in part on the viewer input. In an embodiment, the changes occur in real time or in other words, at substantially the same time the viewer input is received at the content provider 102 or the production system 104.

In another embodiment, the viewer 106 comprises the production system 104 such that the viewer 106 can create a new production using the original production or original programming content. In an embodiment, the new production is broadcast through the communication medium 108 to another plurality of viewers 106. In another embodiment, the new production is broadcast over the peer-to-peer network 402 to another plurality of viewers 106.

In an embodiment, after selecting a production, the viewer 106 is offered several interactive viewing options. The options can be embedded in the channel page or as part of the media player. The options can be operated by selecting icons or key words, key commands, voice activation, or the like. The options include the ability to edit or replace visual media, such as video, photographs, and the like, commentary, music, text, and the like. The viewer 106 can select new commentary with the option of keeping the original commentary or replacing the commentary. The interactive software allows the viewer to manipulate the production for the creation of a new live broadcast. In another embodiment, the new production is stored for a delayed broadcast. The viewer 106 can ignore the options and simply watch and/or listen to the production as it is broadcast.

The interactive edits can change the original broadcast and could allow other viewers 106 entry into a broadcast that was otherwise of no or little interest to them. For example, Viewer A 106 selects Sporting Event X, which is offered with an English commentary. Viewer A selects "New Commentary". In an embodiment, this action mutes the original commentary. Using devices, such as a microphone 206 and a sound card, Viewer A 106 records a new commentary in another language that is inserted into the production. Viewer A keeps this commentary private, for personal use, for example, or offers it to other viewers 106. Instead of the original English commentary streaming in, the new commentary in another language streams out. The channel in the interactive television programming system 100 offering the Sporting Event X with an English commentary now also offers the Sporting Event X with the commentary in the new language. Rather than a new language, the new commentary can be another interpretation of the event.

In another embodiment of interactive viewing, the viewer 106 can select "New Video", which allows the insertion of new video, and/or the deletion of the current video. For example, Viewer A is an alumnus who edits into the broadcast production "new video" of old sporting events. In an embodiment, the new video can be seen in a second media player window, or section of the event broadcast. In another embodiment, the viewer 106 adds photographs to the broadcast production. In another example, the viewer 106 adds visual media to an audio production. In yet another example, the viewer 106 mutes the existing soundtrack within a production and adds his favorite songs. All of the above examples of inserting new content can include multiple interactive viewers 106 from multiple locations, who share the editing of the production to create new productions.

Figure 5:
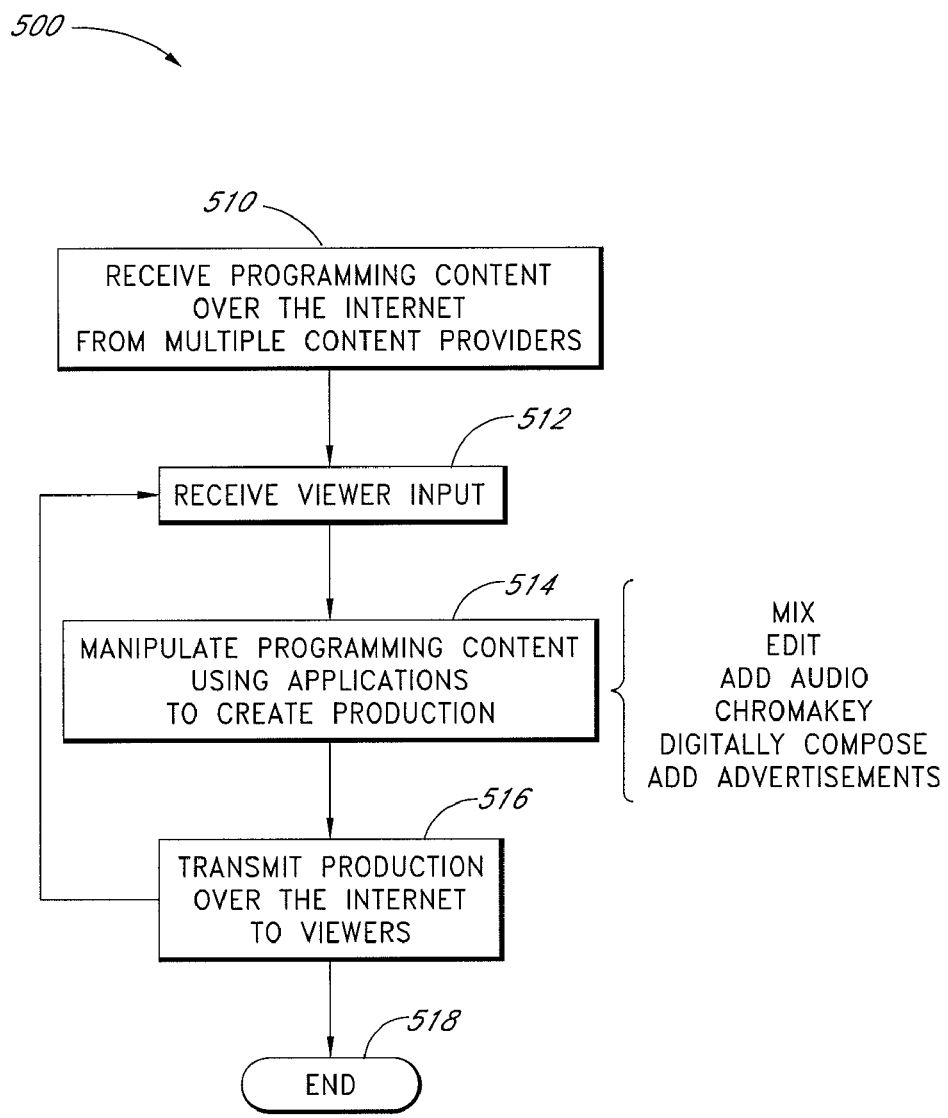
FIG. 5 is a flow chart illustrating the interactive television method, according to an embodiment of the invention.

FIG. 5 is a flow chart illustrating an interactive television process 500, according to an embodiment of the invention. In block 510, the production system 104 receives programming content from the plurality of content providers 102 through the communication medium 108, such as the Internet. In an embodiment, the program content comprises streaming media, such as streaming audio and/or video files. In block 512, the production system 104 receives viewer input from at least one viewer 106. In an embodiment, the production system 104 receives the programming content prior to receiving the viewer input. In another embodiment, the programming system 104 receives the viewer input after receiving the programming content. In an embodiment, viewer input comprises voting, survey results, talent scouting, viewer preferences, viewer information associated with the viewer's IP address, and the like. For example, viewers 106 vote and/or select the best player, hit, action, play, etc. of a sporting event. These viewer selections allow the producers and directors of the original content to highlight these scenes for future broadcasts.

In block 514, the production system 104 creates a production by combining and manipulating the program content. In an embodiment, the processor 302 executes the program 306 to manipulate the streaming media using keying technology, music, graphics, advertisements, sound effects, stored video, alternate commentary, and the like stored in the database 308. In another embodiment, the processor 302 executes the program 306 to combine, edit, superimpose, and the like the streaming media. In an embodiment, the production system 104 manipulates the streaming media, based at least in part on the viewer input. In an embodiment, the production is modified at substantially the same time the viewer input is received. In another embodiment, the production is modified based at least in part on the viewer input in real time.

In block 516, the production system 104 transmits the production to the viewers 106. In an embodiment, the viewers 106 send viewer input as a result of receiving the production. In another embodiment, the viewer 106 sends the viewer input to the production system 104. In another embodiment, the viewer 106 sends the viewer input to the content providers 102. In this scenario, the process 500 loops between blocks 510, 512, 514, 516, and the production can be modified based on the viewer input to create new productions. In another embodiment, the process 500 loops between blocks 512, 514, and 516.

In another embodiment, the viewer 106 functions as the production system 104, and modifies the original production to create a new production (block 514). The viewer 106 can transmit the production to new viewers 106 over the peer-to-peer networks 402 (block 516). The process 500 ends in block 518.

In an embodiment, the process 500 places no limit on the number of producers and/or directors involved in a production. Producers and directors may stream content to meet the standards of their available bandwidth or the needs of their viewers. In an example, four producers from different locations stream high definition video programming to a director who, using keying technology creates a live interactive product for distribution directly to multiple viewers and to additional viewers through peer-to-peer networks. In another example, the four producers stream broadcast quality video programming to the director. Each producer feeds a video stream into the encoder 208.

From the encoder 208, the content is streamed over the communication medium 108 into the interactive television programming system 100, 600, 700, 800, 900. The director, also using an encoder 208 can interact with each producer individually or as a group. In this example, the director receives the four video streams to view on four screens. The director edits the highlights from each producer onto yet another screen. The director manipulates the four streams using a green screen giving the appearance that the four productions appear in one location. The director also adds music, voice over, graphics, additional footage, advertising, and the like in real time to enhance the final production. This final production is a mixture of multiple original feeds and content that is encoded and delivered over the communication medium 108 as a single stream to the viewers 106. This single stream is much less bandwidth constrained than the original multiple stream content.

The process 500 allows multiple broadcasters and/or producers to stream media data from multiple locations to create a product. Each broadcaster is able to stream unedited video and/or audio to the production system 104. The production system 104 collates the incoming streams in real time to create a production.

In an embodiment, viewers 106 become content providers 102. For example, some viewers 106 can be interactively involved in the production by adding video and/or audio, such as their opinions or music to the production. The producers can choose to include the opinions of the viewers 106 in their live edits or for post event commentary.

In an embodiment, the process 500 enables the live broadcast of an event to include multiple audio and video options for viewers 106. This could include multiple language options, and or multiple production options such as video edits, audio edits, and the like.

Figure 6:
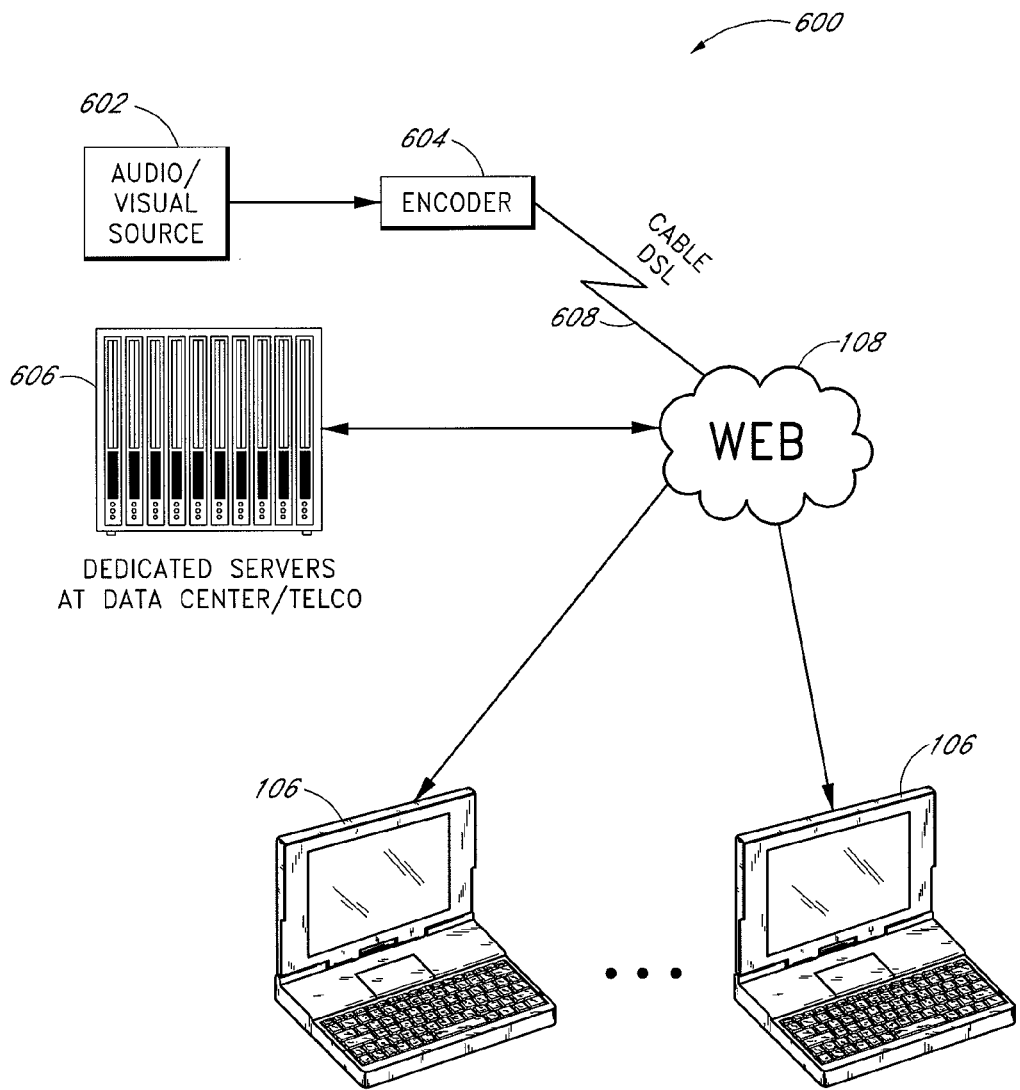
FIG. 6 is a block diagram illustrating another embodiment of the interactive television programming system.

FIG. 6 is a block diagram illustrating another embodiment of an interactive television programming system 600. The interactive television programming system 600 comprises an audio/visual source 602, an encoder 604, a broadcasting network comprising a server 606 and the communication medium 108, and the plurality of viewers 106. In an embodiment, the server 606 comprises the production system 104.

The encoder 604 encodes the audio/visual source 602 and transmits the encoded audio/visual data over the broadcasting network to the server 606. The server 606 manipulates the received audio/visual data to create a production and transmits the production over the broadcasting network for distribution to the viewers 106.

Examples of encoders 604 are software based encoders, such as Microsoft Windows Media Encoder 9.0, and hardware based encoders, such as DSP Research Models DS-400xHI, DS-400xHCI, DB-1004C, DS-80xxHI, VBrick Systems, Inc. Models 9110-6200, 9110-4200, 9110-4300, 9110-5200, 9110-5300, 9130-4300, 9130-6200, 9170-4200, 9190-4200, and 9190-4300, and the like. The software based encoder runs on a computer and connects to the communication medium 108 through the computer. The hardware based encoder connects to a computer and then to the communication medium 108 through the computer, or connects directly to the communication medium 108 using the encoder's unique Internet Protocol address.

In an embodiment, the encoder 604 interfaces with the communication medium 108 over any adequate connection method 608, such as, for example, a digital subscriber line (DSL), asymmetric digital subscriber line, symmetric digital subscriber line, satellite, wireless, T1, cable, and cell phone, and the like.

In the embodiment illustrated in FIG. 6, the server 606 interfaces directly with the main communications bus of a telecommunications company. Incorporating a tier for the Ethernet burstable pipe up to infinity permits the interactive broadcast system 600 to use one access pipe. In an embodiment, the server 606, software, and the like are pre-configured to burst to 100 Mb Ethernet protocol to avoid time delays and additional costs related to a transition from one circuit type to the other.

Figure 7:
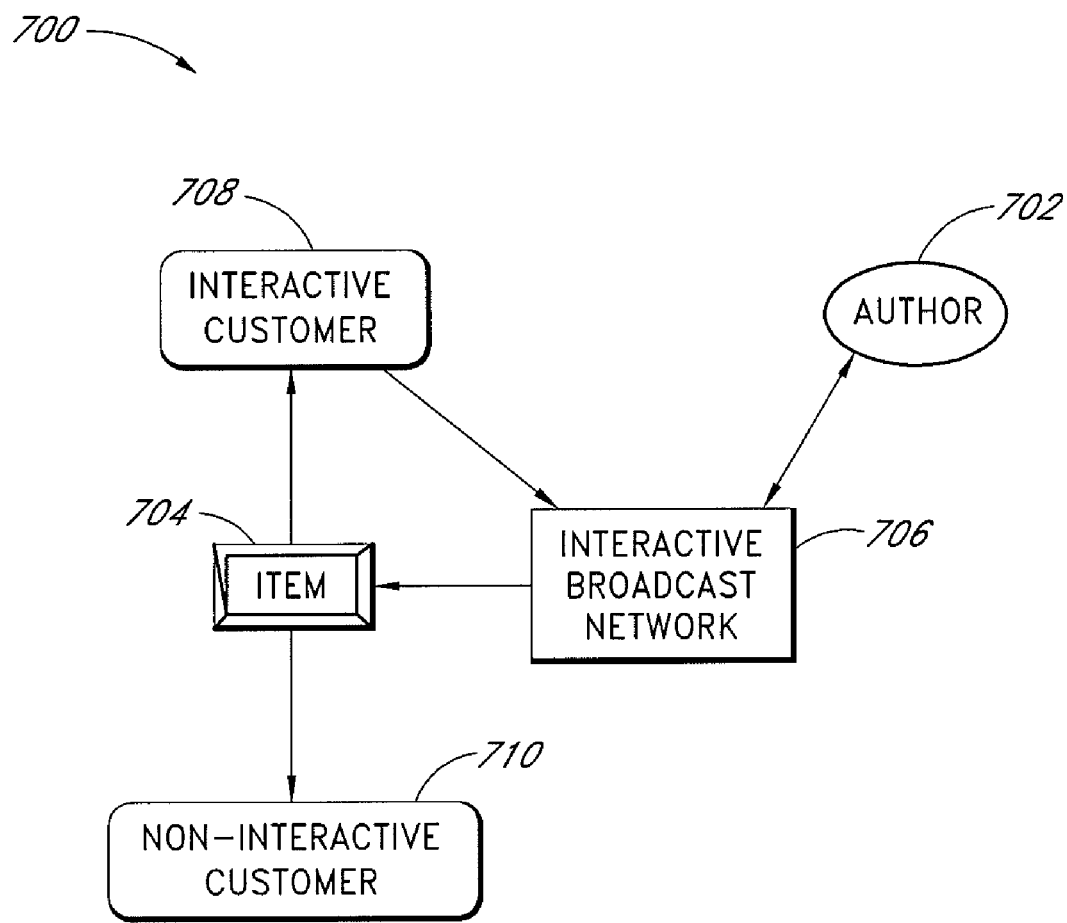
FIG. 7 is a block diagram illustrating another embodiment of the interactive television programming system.

FIG. 7 is a block diagram illustrating another embodiment of an interactive television programming system 700. In the process 500 associated with the interactive television programming system 700, an author 702 creates an item 704, which is broadcast over an interactive broadcast network 706. In an embodiment, the interactive broadcast network 706 comprises the production system 104 and the communication medium 108. The author 702 comprises a broadcaster 702, a director 702, a journalist 702, and the like. The item 704 comprises a production 704, a broadcast 704, and the like.

The item 704 is received by customers through the interactive broadcast network 706. The customers comprise interactive customers 708 and non-interactive customers. The interactive customers 708 and the non-interactive customers 710 comprise fans 708, 710, executives 708, 710, board members 708, 710, journalists 708, 710, an audience 708, 710, and the like, respectively. The interactive customers 708 interact with the author 702 over the interactive broadcast network 706.

The authors 702 and the customers 708, 710 can use portable audio-visual recorders such as cell phones, personal digital assistants, laptop computers, computers, cameras, video recorders, and the like to record content, and to broadcast, communicate and interact through the communication medium 108.

Using satellites, global positioning satellites, wireless technology, Blue Tooth technology, Internet, cable, broadband broadcast technology, analog broadcast technology, and the like, the authors 702 and the customers 708, 710 broadcast items 704 from locations devoid of hard-wired telephonic communication systems, such as landlines, and the like.

The process 500 enables multiple authors 702 and customers 708 to interact live to create programming similar to television programming. For example, executives, acting as both authors 702 and customers 708, 710, who fly from city to city for board meetings, can conduct an interactive broadcast 704 from their own office. While multiple authors 702 and customers 708, 710 are interacting during a live broadcast, such as the board meeting 704, two or more interactive customers 710 can choose to separate from the main broadcast to conduct another interactive broadcast 704, and then return to the board meeting 704. In an embodiment, multiple viewing windows on each screen and/or multiple screens allow the interactive process not to interfere with the 'main' live broadcast.

In an embodiment, the process enables authors 702 to offer customers 708, 710 multiple visual and audio options on the same channel in real time. For example, producers of a sporting event or broadcasters 702 can offer fans 708, 710 multiple camera streams and or commentaries. The multiple audio and visual options enable fans 708, 710 to become directors 702 by selecting the offered camera and audio streams to create a personalized live production 704 for their viewing. Fans 710 can participate during a live broadcast by streaming their own commentary to other interested fans 710, 708. In an embodiment, fans 708, 710 can pause, rewind and fast-forward the live broadcast 704. Fans can choose to block certain broadcasters 702.

In another example, the process 500 permits a live press conference to include journalists 708 from around the world. Each would be able to participate and interact in 'broadcast' quality live audio/visual streaming without traveling to the venue. This eliminates the expense of travel and greatly reduces the often prohibitive costs of production.

The process 500 allows the author 702 to communicate to a larger audience 708, 710 by offering a variety of commentaries and or multiple languages at the same time as the broadcast 704, or live, on the same channel.

Figure 8:
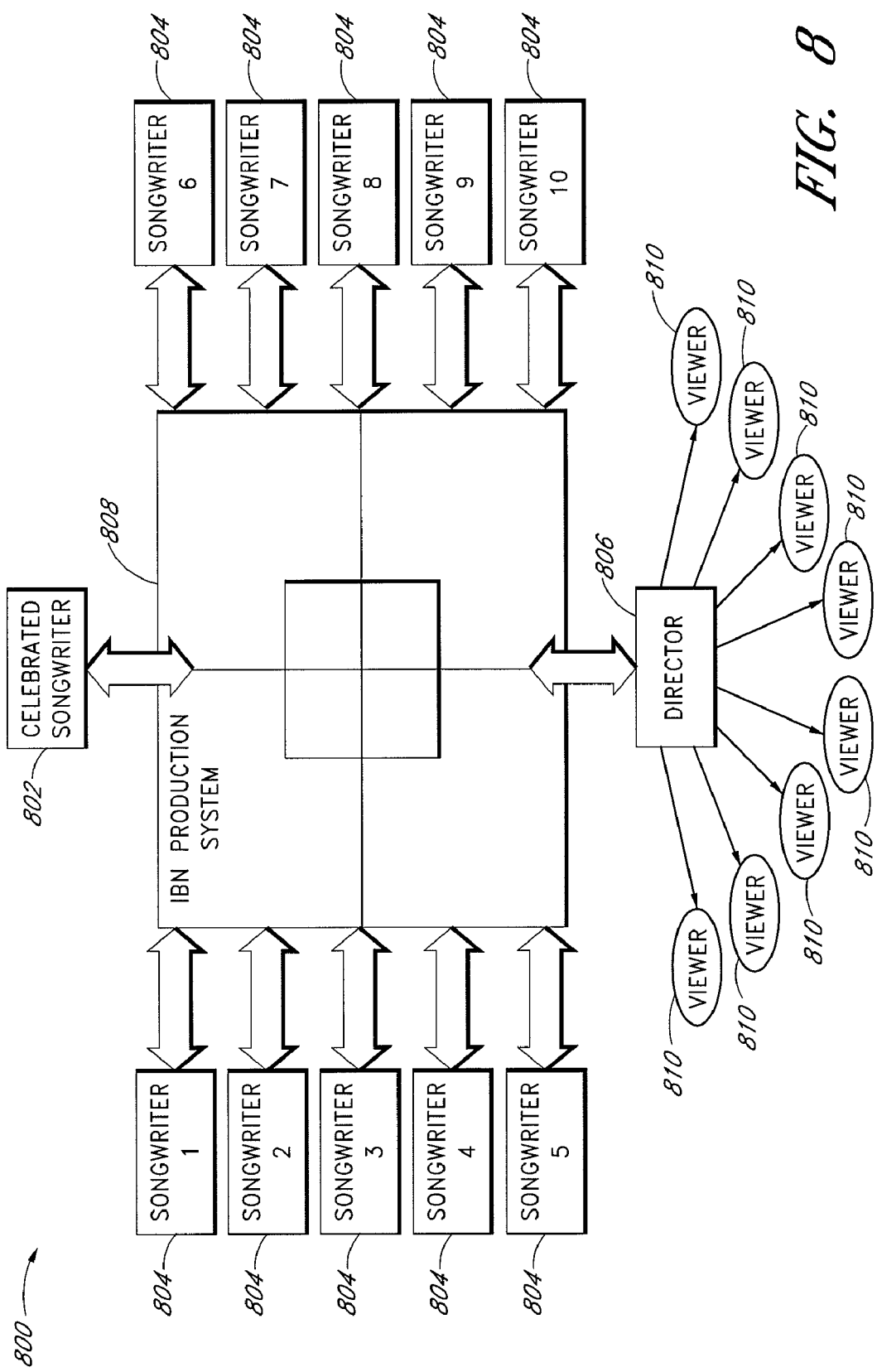
FIG. 8 is a block diagram illustrating another embodiment of the interactive television programming system.

FIG. 8 is a block diagram illustrating another embodiment of an interactive television programming system 800. In this example, a celebrated songwriter or educator 802 conducts a workshop with 10 participant songwriters 804. In an embodiment, the 10 participant songwriters 804 won the right to interact with the celebrated songwriter 802 based on their experience and/or because they out bid other qualified participants. The celebrated songwriter 802 and the 10 participant songwriters 804 are streaming 'broadcast' quality video from different locations to an interactive broadband network (IBN) production system 808. In another embodiment, the celebrated songwriter 802 and the 10 participant songwriters 804 are streaming high definition video. A director 806 manipulates the streams to create a live broadcast for worldwide viewing to a non-interactive viewing audience 810. In an embodiment, the broadcast is also recorded for later viewing, such as on-demand viewing.

In an embodiment, the communications between the celebrated songwriter 802, the participant songwriters 804, the director 806, the viewers 810, and the production system 808 occur through the communication medium 108. In other embodiments, at least one communication path between the celebrated songwriter 802, the participant songwriters 804, the director 806, the viewers 810, and the production system 808 occur through the communication medium 108.

The embodiment 800 enables students in remote areas to enjoy education from specialized teachers at a more affordable cost than what is available to them in their locale. For example, a violin teacher based in Moscow and a student based in Chicago each log into a designated cyber room at an agreed time. Each using an encoder, they interact in much the same way as if they were in a 'brick and mortar' room together.

Figure 9:
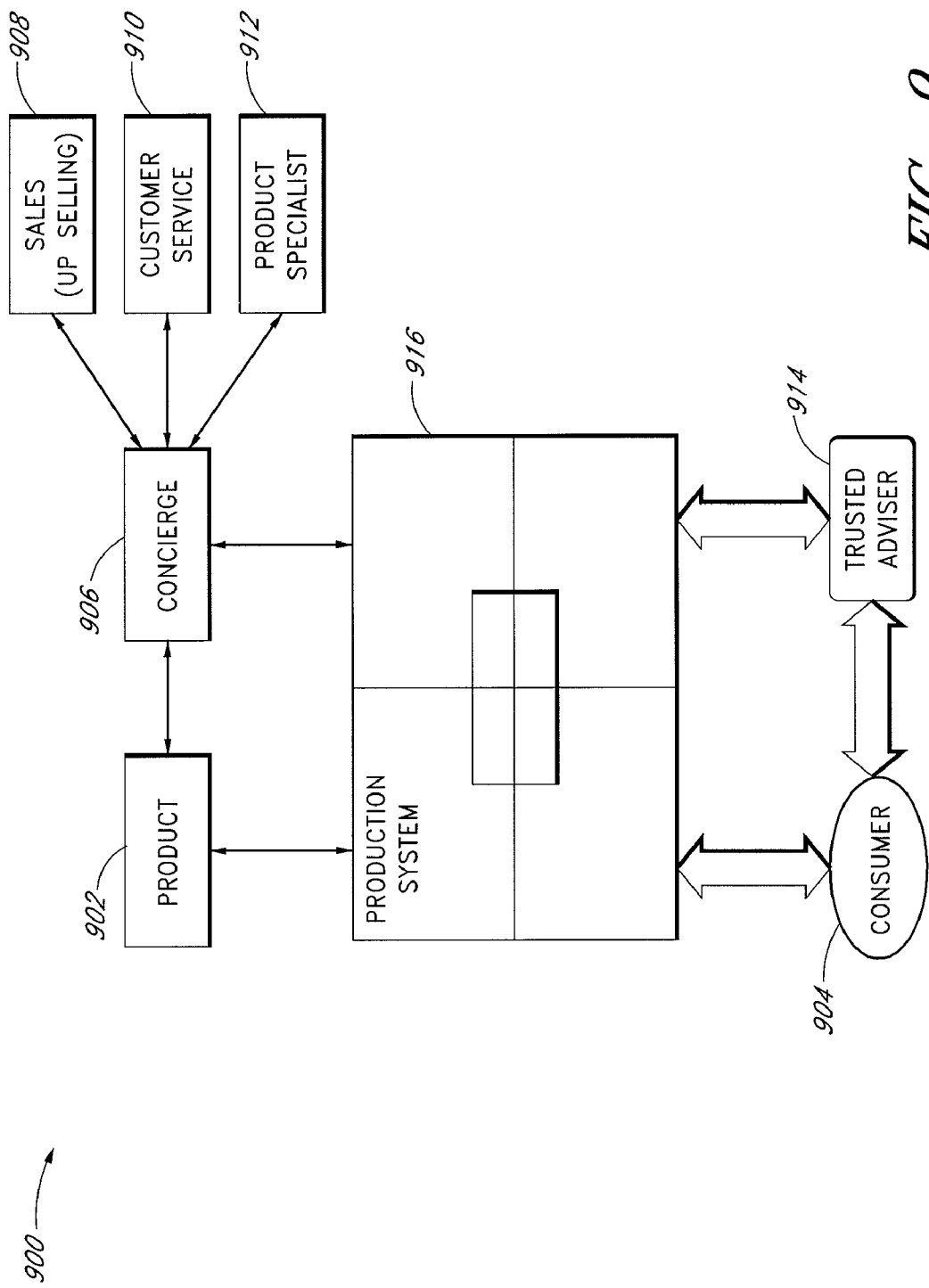
FIG. 9 is a block diagram illustrating another embodiment of the interactive television programming system.

FIG. 9 is a block diagram illustrating another embodiment of an interactive television programming system 900. A producer 902, representing goods and services, sets up an interactive viewing experience for a consumer 904 using a production system 916. In an embodiment, the production system 916 comprises the digital camera 204, the microphone 206, the encoder 208, the processor 302, the program 306, and the database 308.

Consumers 904 viewing the site or channel interact with a concierge or receptionist 906 for assistance. The concierge 906 introduces the consumer 904 to others in the sales chain, such as sales representative 908, customer service representatives 910, product specialists 912, and the like, in the same manner that the concierge 906 directs the consumer 904 upon entering a showroom or department store. As well as affecting an immediate sale, the sales representative 908 can also up sell or engage the services at the same time of the product specialist 912, and the like. In this example, the consumer 904 also interacts with a trusted adviser 914. In an embodiment, the trusted advisor 914 comprises an expert in the product or field. The consumer 904 and trusted adviser 914 can choose to interact privately to discuss the sale.

In an embodiment, the communications between the producer 902, the consumer 904, the concierge 906, the sales representative 908, the customer service representative 910, the product specialist 912, the trusted advisor 914, and the production system 916 occur through the communication medium 108. In other embodiments, at least one communication path between the producer 902, the consumer 904, the concierge 906, the sales representative 908, the customer service representative 910, the product specialist 912, the trusted advisor 914, and the production system 916 occurs through the communication medium 108.

The interactive television programming system 900 fosters an ongoing relationship with the consumer 904, the development of dedicated product programming, training, up selling, and the like. Customer interaction also helps develop new programming, which can be viewed by the next generation of consumers 904. With the possibility of creating an interactive network, retailers and manufactures are able to entertain and interact with consumers 904 while enjoying direct sales.

The following examples illustrate various embodiments and uses of the interactive television programming system 100, 600, 700, 800, 900.

In an embodiment, the interactive television programming system 100, 600, 700, 800, 900 can be used for an auction. In this embodiment, consumers engage the services of different trusted advisers while a producer offers the expertise and services of one or more auctioneers. The process 500 allows for live interactive auctions with a worldwide participating audience. Multiple participants engage in an interactive broadcast (stream) to buy, sell, or compete for the right to buy or sell products. An auctioneer monitors the incoming streams and directs a live broadcast. The auction can be viewed by people from around the world who are not participating in the auction. The live broadcast of the auction to the non-participating audience creates a type of reality TV phenomenon that entices more potential buyers and sellers to the site or channel. This creates more advertising opportunities.

In another embodiment, a financial transaction could take place between two or more viewers (buyers and sellers) during an interactive event. In one example, a viewer could respond to an advertisement inside a broadcast event. This action could open up a second viewing window allowing 'real-time' interaction between buyer and seller. The negotiation and transferring of funds could be conducted in a private and secure interactive environment utilizing such transaction methods as credit, debit and check cards, PayPal, electronic checking, and electronic fund transfers and the like. In another example, a viewer could interact with a bank teller to deposit and withdraw monies.

In another embodiment, the process 500 creates an interactive sales system. Buyers no longer have to rely on a photo of a product, but can view a product demonstration. For example, a seller of a vintage guitar can play the guitar or focus the camera on any feature of interest to the buyer. The system supports multi-languages so that buyers and sellers from around the world can interact with the benefit of simultaneous language translation. Sellers are able to up-sell related products and services to buyers.

In another example, a retailer could set up a unique channel or network of channels that would appeal to potential clients and customers which offer interactive viewing experiences on various product lines. In the same way that a visitor to a major shopping center calls for the assistance of a salesperson, the interactive television programming system 100, 600, 700, 800, 900 solves that problem for online shoppers. For example, a live cyber salesperson can direct the online customer to any product, site, store, or department or help complete a sale. As the customer and salesperson interact in high quality audio/visual streaming, a faster and more enjoyable shopping experience occurs. A cyber sales team is able to interact with multiple customers in audio/visual real time.

The customer is also able to interact with multiple customer service or sales agents at the same time, using multiple windows, for example, in pursuit of better service. The process enables customer service, company information, and sales on the Internet to be more personal.

For example, a business sets up a plurality of monitors in a reception area. As a customer enters, the receptionist on the first monitor welcomes the customer and provides any pertinent information. The customer asks to talk to the manager. The receptionist contacts the manager. The manager either comes to the reception area or enters into an interactive discussion via a second monitor. The process also enables manufacturers to demonstrate new product development and interact with multiple sales teams around the world.

In another example, a manufacturer of a new guitar amplifier is able to demonstrate the complexities of the product in real time to vendors around the world. For example, an interactive vendor from Zurich would be able to broadcast an audio stream of a guitar part that he is playing live into the guitar amplifier in Los Angeles and listen to the product in real time. This saves both the manufacturer and vendor the cost of travel and shipping sample units.

In another embodiment, an online music warehouse channel comprises broadcast quality video and audio media content featuring musical instrument demonstrations. Retailers can select from a variety of media content streams to showcase instruments to their customers. The customers can view and or listen to different and/or competing models and/or make a purchase. Multiple customers can also interact with live professional musicians showcasing the products of interest.

Another embodiment enables a business to employ a receptionist based in a separate location and via interactive broadcasting the receptionist communicates with multiple customers in real time from around the world. A receptionist is able to represent many clients or businesses in high quality audio/visual media interaction. The process 500 allows a receptionist or salesperson based in India, for example, to greet and inform customers from all over the world.

The process 500 encourages the development of television type broadcasts for business to business communities. For example, a Product Sponsor has a relationship with 1,000's of Financial Advisors. Each Financial Adviser has a list of 300 to 500 clients. The Product Sponsor can schedule a live broadcast event to include several Top Financial Advisors (in their specialty) and Celebrity Expert Guests who are recognized as experts on the subject (and/or product type). The Product Sponsor can also invite all of the Financial Advisors who in turn can invite their clients. Each participator can broadcast and interact from their own location while the clients of the Financial Advisors can be viewing (and or interacting with) the broadcast from their home or office. The broadcast may also be open to the public for general viewing. The Product Sponsor or company providing this service can act as director (or moderator) and can utilize green screen technology to create a type of TV experience. This could allow each participant to appear as if in the same room or TV set. This process could be of particular interest and benefit to the Financial Advisor who can be seen (by his viewing client base) discussing financial and investing strategies with other Financial Advisors, the Sponsor, and Celebrity Expert Guests. A client could interact with his/her Financial Advisor to ask a question, who in turn could follow this up directly with the Celebrity Expert Guest. This could lift the profile of the Financial Advisor amongst his/her client base. This 'private', target market live broadcast can also provide unique opportunities to Product Sponsors to allow them to explain the benefits of the product to thousands of Financial Advisors and hundreds of thousands of potential investors simultaneously. The process can continue as the recorded content can be viewed again (any time) by the clients or new clients. The content can also be edited repeatedly by the Financial Advisors to create new content and new broadcasts targeted to their clients. These actions promote the Sponsor's product repeatedly to potential investors.

The interactive television system 100, 600, 700, 800, 900 can be used to create news and current affairs programming by allowing correspondents (amateur or professional) from around the world to gather news stories and up load the content. An example of this is a news story about a plane crash. One witness up loads several photographs, and another witness provides a different piece of video evidence. Another member creates a podcast describing the event, while another edits the three elements together, adding music, graphics, and advertisements from the content library. The new production is then broadcast across the interactive network. Other broadcasters can also use elements of this production in a new production about the incident. In an embodiment, the content owners share in the revenues garnered from advertising inserted in the productions.

In another embodiment, events broadcast to and from night clubs or other similar venues can use the process 500. Fans from one club can interact with fans from another. Promoters can view voters' response and demographic interest for the purposes of booking artists into venues. The interaction of fans can create new methods of advertising within the Internet market place. Fans can be offered incentives to participate in continued or perpetual market research. Customers can also be given the rights to view live entertainment venues, such as clubs, theaters, and the like.

In an embodiment, venues, such as clubs, theaters, malls, hotels, and the like use the interactive television system 100, 600, 700, 800, 900 to include live interactive events. By staging an interactive broadcast, a hotel, for example, is able to draw upon the customer bases associated with such events as sports, book signings, literature readings, business conferences, etc. The venues develop a unique marketing approach for live interactive broadcasting within industries and markets that draw customers into their establishments.

For example, a niche producer, or broadcaster can create a partnership with a hotel to develop a live interactive broadcasting service. The hotel sets up a room, such as a banquet room, for example, as a TV production set. This would allow presenters, such as local teachers, authors, artists, public speakers, politicians, and the like to have their own platform for broadcasting. The producer and the hotel are able to provide a setting, production expertise, and worldwide broadcasting capabilities that would otherwise be unavailable to the presenter. The presenters draw their fan base or customers and related business to the hotel. The ability to broadcast live events to a niche market greatly enhances the business of hotels and other event centers.

In another embodiment, the process 500 encourages members to invest in the future success of a product, a company, an artist, or another member. The members' interest and financial investment enable the development of the new product. This embodiment can encourage members to create and develop a new label, company, and the like. For example, a member likes the sound of a band, which is broadcasting over the interactive television system 100, 600, 700, 800, 900 and believes that the band has a future. The member invests money into an account. When the account has the desired amount for production, the band creates a product. This process helps new artists develop their craft with the possibility of creating a product. The fan involvement demonstrates the marketability of the new artist. Major product developers would then have more confidence in promoting the artist. The presale of product (and/or investment) could also provide the fan with a percentage of future earnings of the product and/or the 'artist'.

The process 500 can develop talent and skills within the membership or viewing and interacting community. In another embodiment, professionals skilled in their chosen craft or master craftsmen broadcast demonstrations to viewers interested in the mentoring programs of master craftsmen.

For example, a young man wanting to be a sports commentator enrolls in an interactive lessons program for sports and media broadcasters, hosted by various celebrity commentators. The system 100, 600, 700, 800, 900 allows multiple participants to interact with the celebrity commentator. In an embodiment, each interactive student pays an agreed amount or bid to be included in the lesson. Once the student passes this stage, he could continue to study or earn the right to be a commentator in low-level sporting events, such as high school football, for example. The process allows gifted or hard working novice students to progress through the sports casting system. In an embodiment, other members vote or post comments about the student performances. In another embodiment, talent scouts viewing the student performances through the interactive television systems 100, 600, 700, 800, 900 draft the students into new production situations. This process would apply to many other broadcast related occupations such as editors, musicians, writers, directors, movie producers, authors, actors, etc, and/or other occupations such as doctors, teachers, fitness trainers, chefs, etc. The efforts of the talent scout and/or the viewer voting may lead to the student being offered a contract or a position in a professional production company.

This method of distance learning allows gifted master craftsmen from all over the world to be involved in the mentoring program. The live lessons can also be edited into other lessons and or other digital content that could be included in other broadcasts.

In yet another example, the tutoring and mentoring of students can be part of a high school or college program to develop a production and broadcasting department within the student body. The initial stages of talent development can also mean that the student/school pays or bids to be part of the tutoring program, while the production and broadcasting of content could lead to revenue streams.

A teacher can monitor the progress of multiple students in real time. For example, a teacher based in Los Angeles can conduct an interactive class with multiple students from around the world. The students interact with each other as if they were in the same classroom. The interaction of each student enhances the learning experience of other students. The live broadcast can also be available to non-interactive customers.

For example, a Yoga instructor interacts with 50 students, monitoring the progress of each, and highlighting the activity of one student to demonstrate a position to the others. When a student asks a question, the instructor is able to 'cut' to the student's stream so that the production item now features the student asking the question. The students are able to participate in an exercise class in real time with other students of similar ability from the comfort of their home.

In another example, the process 500 enables the broadcast of a live discussion between Bill Clinton and 25 United Nations Delegates to discuss world hunger. Each participant has the ability to broadcast and receive a media stream and interact with each other. In this instance, Mr. Clinton acts as the moderator and chooses the broadcasts of each delegate to create a montage or production on the subject. While the interaction is limited to the invited guests, the live broadcast would be open to any interested viewer or customer.

In another embodiment, the interactive television system 100, 600, 700, 800, 900 can be used to produce interactive talk shows and blogging commentary. The moderator monitors incoming streams to choose the most entertaining and/or provocative opinions. Customers wanting to participate, stream their audio/visual opinions to the moderator and the moderator produces a live item. For example, during a TV or radio type of talk show broadcast it is common for an audience member to stir up interest and or controversy by his comments and interaction with the host. This development of new talent, such as the fan celebrity creates opportunities for other content, which builds around these new 'hosts'.

In another embodiment, the interactive television system 100, 600, 700, 800, 900 can be used to produce interactive radio talk shows and blogging commentary. The moderator monitors incoming streams to choose from a number of viewers and to whom to place on the call. It is similar to a talk radio show that has hundreds of callers trying to call in to the show and ask questions of the host or another guest. In this embodiment, the caller is both an audio and video caller. The host can select one or multiple video callers to add to the live production and to interact live with the host or the guest. These multiple video participants add live content to the talk show.

In another embodiment, the interactive television system 100, 600, 700, 800, 900 can be used to allow all embodiments herein. Examples of the embodiments include, but are not limited to interactive auctions, interactive retailers, interactive supermarket, interactive auto sales, bank and finance transactions, interactive search engine, interactive gambling, interactive video gaming, interactive graphics, interactive construction, interactive mining, interactive transport, interactive boardroom, interactive court proceedings, interactive government sessions, interactive human resources, interactive entertainment, interactive telecommunications, interactive market research, interactive interior design, interactive hotels, interactive business to business, interactive communities, interactive veterinary science, interactive sports, interactive product development, interactive talent search, interactive futures, interactive productions, interactive translation, interactive blue screen, interactive health, and the like.

In an embodiment, individual participants use the television system 100, 600, 700, 800, 900 to become their own broadcaster and create their own personal family channel. By embedding the encoder 208 in a set top box such as a TIVO or cable box, the encoder 208 receives the output of the camera/video recorder 204 and the output of the microphone 206 and encodes the information for transmission through the communication medium 108 to the production system 104. The production system 104 receives similar live content created by other family members interacting on this unique family channel. From the convenience of their home in front of their own TV, they can interact and create live content together, watch family movies together, or just interact with family members.

In one embodiment, fans unable to speak to the main host can chat with the fan celebrity. The originators of the talk show can regard this as a spin off that caters to a slightly different audience. The continuation of this process may lead to a multi-channel talk show, with multiple hosts, many of whom were discovered through the interactive broadcast process.

In another embodiment, a news or celebrity commentator encourages fans to interact with multiple broadcast responses. In some cases, these comments can arouse as much or more interest than the original commentator. This creates opportunities to expand the broadcast and develop customer interest in the channel.

In another embodiment, advertisers target member broadcasting. Members, who either create broadcasting in response to content, such as movies, news, sporting events, and the like, or by using the production tools and content pool to create new content for their unique broadcast, can be targeted by advertisers for advertising placement. For example, a member's commentary on current affairs stirs interest from other members that results in a new fan base. Though the commentary is in response to other broadcasts, the new broadcast is unique and advertisers place advertising in various forms directly into the new content.

A member or a group of members can create more customer interest in a particular broadcast than the originator. These members can be viewed as 'scouts'. For example, a customer, watching a live football game, deletes the commentary, adds a new commentary, and then shares this new product with friends. In another example, the same football game, which offers a commentary in one language, is edited by multiple customers, each replacing the original commentary with his language so that the game can be enjoyed by a much wider audience. In yet another example, one customer can add other video content, such as highlights of other matches, for example, to the original content, which creates a new program. For example, a fan in Los Angeles is watching a live football game featuring his favorite team. The Los Angeles fan adds his commentary to the live broadcast and shares the new product with his friends or the friends could be commentators and share the experience of a live game together, each in a different location. This niche interactive broadcast could be private or public.

In another example, using green screen technology, multiple sports commentators from multiple locations can be placed behind the same desk in a TV set to appear as if they are together for the production.

In another example, utilizing holographic technology, multiple producers from multiple locations can interact to create a realistic live event in one setting. A violinist from Moscow, a cellist from New York, and a pianist from London could play the same piece of music simultaneously and broadcast the holographic images and high definition audio through the interactive broadcast system. Viewers from around the world could 'project' the images and sound into the room of their choice to create a unique viewing experience.

Another example of the process 500 could enable producers and or viewers communicating in one language to interact in real time with producers and/or viewers communicating in other languages utilizing such technologies such as voice recognition, voice translation, text to voice synthesis, and the like.

In another example, utilizing such technologies as simultaneous language translation, a person from Canton can share life stories with a person from Peru while simultaneously communicating with another person from Zurich. In another example, a French speaking customer can engage the services of a Cantonese salesperson and conduct a transaction. A 'cyber' receptionist could be empowered to serve customers from around the world no matter the language of origin. A broadcaster could stream content in one language while customers listen to the content in their own language.

In another embodiment, a local bank could expand its business practice by interacting with customers beyond its immediate locale. The process could allow smaller financial institutions to offer services appealing to a global market and engage in activities such as international investment, international loans, currency exchange, and the like. A local bank could also offer the services of live interactive financial officers who, unlike automated banking systems, can up sell the products and services of the bank to the customers.

In another embodiment, an online store offers the services of a 'real person' to assist visitors in their search and/or research. The search aide, an expert in a field of study or business, helps the customer(s) to navigate the site, develop the search, discover related topics, goods, and services, and/or make a purchase. Both the customer and the search aide communicate and interact using audio and video streams, which can be recorded by either participant.

In another embodiment, commercial vehicles can be equipped to interact with other vehicles, transport control centers, and the like around the world. This process comprises satellite, GPS, analog, digital, and broadband communications. In one example, a flight crew on board a commercial jet aircraft faced with a passenger related medical emergency requests the assistance of a doctor based in a city hospital. Equipped with portable audio and visual broadcasting devices, a flight steward broadcasts and interacts with the doctor who in turn broadcasts medical advice and assistance to the aircraft.

In another embodiment, comprising such technologies as surround sound, green screen, holographic, and 3D imaging, multiple participants broadcasting from multiple locations can be placed inside a board room and around a table to emulate the experience of a life-like corporate meeting without all of the participants being in the same location.

In another embodiment, individuals or groups of individuals from multiple locations can create a shared broadcast that emulates the experience of sharing quality time together. A young family living in Boise could invite their relatives living in Queens to share a meal time together. Using green screen technology the two families could appear to be sitting around the same table in the same room. The individual family members could talk, laugh, and catch up on old times with several conversations going on at the same time. Utilizing holographic, surround sound, and/or 3D technologies, the life-like images of the relatives in Queens could be 'transported' into the living room of the young family in Boise.

In another embodiment, a customer uses the interactive process 500 as a multi-channel communications system. The process could allow the customer to receive and/or broadcast on many channels or streams, interact with multiple broadcasters, such as friends, family, advertisers, and the like on a split screen or multiple screens, preview or block incoming streams or calls, and or record incoming streams for later viewing and/or new content distribution.

In another example, two opposing alumni watching the same live event could each create a unique product that is made available to their respective alumni audience. The new broadcast is not limited by the original content. Each alumnus inserts a new commentary, private jokes, other related game highlights, anything that may be of interest to this niche viewing audience, and the like. Unique advertising sponsoring the alumni event could also be inserted to target the audience.

In another embodiment, multiple producers and broadcasters can preview multiple low-resolution media files corresponding to high-resolution video and audio streams from within a multi-window menu during a live event. Upon selecting a low-resolution file, the corresponding high-resolution stream can be edited into a new live broadcast. In one example, each race car involved an Indianapolis 500 event is installed with a camera and a microphone. The media packages are streamed from each car into a content menu for producer preview prior to broadcast. Sponsors, outside producers, and fans can select their favorite driver 'cam' or the parts of the track that are of most interest to them to create their own production which can be then streamed out as a new broadcast.

In another example, a fan club of the Princeton quarterback produces a show by selecting the cameras focused on the quarterback and his movements on and off the field. The special broadcast is available to the fan club, either on the same channel as the original broadcast or another dedicated channel.

In yet another example, alumni, or fraternities broadcast their own unique audio commentary. Though the official game commentary is offered as part of the original broadcast, the Los Angeles branch of the Princeton alumni organization broadcasts a more animated or satirical commentary while the New York branch of the Harvard alumni organization broadcasts a commentary featuring past Harvard players. Each commentary is available to customers viewing the live broadcast.

In a further example, alumni originally from Beijing and Paris broadcast commentaries in their native language. While watching the game live, they broadcast their unique spin on the events and the commentary is included as an option in the menu of the item's broadcast. Customers could choose to watch the game and listen to commentary in French or Mandarin.

The process associated with the interactive television system 100, 600, 700, 800, 900 can enable industries such as sports, fashion, art, film making, screen writing, food and cooking, acting, music, and the like to use an international fan base in the search and discovery of talent. For example, a band is searching for a new singer. The band schedules a live event with a time for each interested singer who then broadcasts a high quality stream of his performance. Fans can vote, offer opinions, and compare the talent to other artists. Fans can also enter the search by streaming a live performance of their singing. The process could allow the artists receiving the highest votes to be included in a highlight reel sponsored by the interactive television programming system 100, 600, 700, 800, 900. This production can be entered into the interactive television programming system 100, 600, 700, 800, 900 for continued fan involvement and could continue with each winner or multiple winners moving on towards a record contract.

Multiple live real-time audio/visual streams enable musicians, engineers, singers, actors, directors, and the like to participate in a live production while broadcasting from different locations. Multiple actors from multiple locations broadcast their individual performance to one destination to create a broadcast production as if they were in the same place. Multiple musicians from multiple locations broadcast their unique performance in real time to record a piece of music, just as if they are in the same studio. Using keying technologies and/or holographic technologies, the final product looks and sounds as if they are performing in the same location.

In another example, during a live performance, a band streams multiple channels of audio to a sound engineer in one location while sending multiple video streams to a director in another location. Both sets of media streams are edited and mixed live and sent out as one live production. A producer from yet another location inserts other production elements into the live event such as advertising, commentary, background stories, interviews, fan interaction, and the like.

In another example, unmixed audio tracks of a new song are made available as content by a recording artist to a select group of fans who have won the right to create a mix. Each new mix is broadcast through the artist's channel allowing other fans to vote on the best mix.

In another example, a film director offers uncut footage of a new film while a film composer offers a library of music content to a select group of students. Each student edits together film and music elements to create a new film. Critics, students, fans, and industry leaders can comment and/or vote on each new work.

The process 500 can also embed advertising into each broadcast based on the content subject matter, the popularity of a producer, the internet protocol address of the viewer, and the like.

In another embodiment, artists submit their items to the interactive television system 100, 600, 700, 800, 900, where the items are stored in the database. A producer searches the database for suitable items and creates a production. Advertising is inserted into the production. In an embodiment, advertising revenues are paid based at least in part on the viewer input. In another embodiment, the use of each item is tracked and the corresponding artist is paid a share of the advertising revenues based at least in part on the item usage.

The process 500 involves the archiving of multi-visual (media data) productions previously broadcast within the interactive television programming system 100, 600, 700, 800, 900. In an embodiment, the archived media is available for parents, coaches, scouts, etc. for promotional, personal, or business use. The media can be edited to create a product. The process 500 helps coaches and scouts evaluate the skills of high school athletes and allows athletes to display their talents. The process 500 encourages sponsors, and the like to discover and grant scholarships to underprivileged athletes. It also is an aid to parents, enabling them to build a multi-media profile on their child's progress. The process 500 further comprises teaching parents and athletes how to produce a multi-media highlight reel for promotional or personal use by using the interactive television programming system 100, 600, 700, 800, 900.

In another embodiment, the interactive process 500 expands the gaming experience for participants involved in online gaming. Players or customers connect to the interactive television programming system 100, 600, 700, 800, 900 from different venues, such as clubs, hotels, offices, homes or the like to participate in the gaming process. The interactive process 500 engages players and non-interactive viewers in a reality TV type of broadcast. This allows niche broadcasters to reach their target audience without the high costs of cable or satellite broadcasting.

In another embodiment, the interactive process 500 expands the gaming experience for participants involved in interactive video games. Players broadcast their game performance while viewing and interacting with the other players. Players interact, access each other's computers, and broadcast. Team players in different locations are able to communicate and interact with each other privately, before, during, or after the event.

Non-players are also able to interact or create niche broadcasts of existing live or other game performances. Viewing audience members are also encouraged to participate by broadcasting commentary and or sound tracks. Musical artists add a live sound track to create a unique experience for the gamers and viewers, just like a film score.

In yet another embodiment, interactive court proceedings with attorneys, clients, witnesses, a jury, suspects, and a judge are broadcast. The participants interact without being in the same location. The judge moderates the broadcast so that each participant views the current speaker or other reactions from the participants. The broadcast content from each participating broadcast could be recorded for referral.

In a further embodiment, the process 500 facilitates interactive human resource activities. For example, an interview with a perspective employee can include multiple interviewers interacting from different locations. The employer can perform an online check of the applicant during the interview.

In another example, a band seeking a bass player auditions many interested musicians, each based in a different location. The interactive stream allows both the band and the musician to see and hear each other in real time, allowing a natural flow of information. Fans of the band could interact and vote for the musician of choice. The fan interaction gives the band a targeted market place response and helps them make a business decision.

In a further embodiment, the process 500 facilitates interactive market research. For example, manufacturers test products and/or services with focus groups made up of individuals who are able to participate in a private broadcast production by streaming audio/visual responses. The market research is interactive with producers being able to view and measure the audio/visual responses, such as body language, and the like of each participant. The market research broadcast can be streamed to a wider audience for those who share an interest in the product or service. The broadcast, live or prerecorded, can be sold as a product to other complimentary and interested industries.

Entertainment industries, such as film, television, music, and the like can test pilot concepts to target consumers around the world simultaneously using the interactive television programming system 100, 600, 700, 800, 900. The consumers broadcast and interact not only with the producers of such products but also with each other to form dedicated focus groups or fan clubs. This is a very inexpensive form of market research for the entertainment industry and a productive way to gather product support. For example, an independent film festival or production company can broadcast segments of films to an interactive audience for the purposes of discussing each film's merit and possible release. In another example, a record label can broadcast selected performances, live or prerecorded, to interactive music fans, which in turn vote and discuss each recording artist's merit. The record label, based on the viewer input, awards the winning artist a contract. Other exemplary industries that can benefit from interactive market research comprise automotive, sporting goods, health products, pharmaceuticals, fashion, and the like.

In an embodiment, the process 500 provides interior design functions. Painters, designers, architects, visual artists, and the like broadcast images into homes, offices, restaurants, and the like around the world. Using common items, such as walls, furniture, and ceilings, broadcasters stream art beyond the screen and into daily life.

For example, a simple room with white walls takes on the character of a library, or a garden simply by creating an illusion, using visual and audio data streams. A coffee shop in Austin becomes a cafe in Paris with the wall and ceiling having the three dimensional effect of people sitting at tables, moving traffic, noises, and the like. The broadcast imagery creates some of the aesthetics of a European sidewalk cafe in an otherwise tepid environment.

In another example, a downtown apartment surrounded by traffic noise and chaos is filled with images of green pastures and a running brook with audio to match the environment. Instead of painting or wallpapering, white walls become the artists' canvas or the filmmakers' screen displaying projected scenes of life, colors, and waterfalls.

In another embodiment, advertisers bid for product placement into homes and places of business. The walls, tables, ceiling of restaurants, and malls provide advertising space much like the billboards along the freeway. Advertisers buy space on store walls and ceilings to show their product. In an embodiment, the streamed images are projected using holographic technologies.

Another embodiment comprises content production templates. In one example, a high school with a limited budget and limited 'production' expertise uses pre-qualified music cues, voice overs, graphics, advertisements, and the like to enhance the broadcast of a live sporting event. With a camera, a microphone, an encoder, and a laptop the sporting event can be captured and by methods, such as 'drag and drop', professional production templates are inserted into the live broadcast in real time.

In another embodiment, a medical practitioner or physician in one location examines multiple patients from multiple locations. While the medical practitioner and patient(s) interact during the consultation broadcast, each patients' vital information can also be streamed to the physician and digitally recorded for later study. Utilizing automated production technologies, a physician can 'zoom in' and take a snap shot of any part of the patient's anatomy for further examination. On the basis of this examination, a physician may suggest a follow-up examination by a specialist, direct the patient to more specialized health care, write a prescription, and/or direct the patient to an online pharmacy. The patient can also record the event and keep a digital record of the consultation and diagnosis. In one example, a doctor in India sets up an online practice to serve patients in the United States without health insurance. The Indian doctor's medical practice is broadened while providing a service to patients unable to afford the high costs of regular health care. In another example, a doctor working in a remote location utilizes the expertise of specialist medical practitioners working in John Hopkins to examine a patient in yet another location.

In another embodiment, content elements from similar events are recommended to producers and broadcasters. In one example, several high school football games are being broadcast live simultaneously. Scores, statistics, match highlights, featured commentary, photographs of celebrity attendees, and the like from each event are made available to the other event broadcasters. During a break in play, or during the halftime or final game summaries, the additional outside content can be inserted into the live event broadcast.

In another embodiment, a recording artist streams a live concert to a select group of fans and or promoters. Each fan or promoter is from a different location and each has won the right to gather an audience in their home, local pub, or club to view the live performance. The fans may pay a fee or bid for the viewing rights and/or the event could be subsidized by advertisers based on fan involvement. In another example, the selected fans or promoters have won the right to redistribute the event to their own fan, friend, and/or customer base.

In another embodiment, an outside content provider provides additional audio and/or video content to a producer of a live or other broadcast event. In one example, a production crew in Long Beach uses three video cameras to capture and broadcast a live cycling event. A sponsor of the event interviews riders and fans, and streams the media packages to the event broadcast channel. The producers of the event edit into the live broadcast any of the sponsor's video that is of interest to them.

In another embodiment, a winter sports event comprising down hill ski racing is video taped by fans, friends, relatives, and local news reporters. Each content creator can upload video into an event library. Other content libraries comprising music, graphics, Foley, and the like allow viewers to create professional content broadcasts of the winter sports event.

In another example, viewers interested in the New York marathon can video the race from their apartment or office windows, and stream the live media up onto the dedicated broadcast channel. These video elements are then edited into different broadcasts about the marathon. The original content providers may receive a percentage of revenues based on a pro rata usage of content.

In another embodiment, a track meet involving multiple simultaneous events offers multiple video streams for convenient viewing. In one example, a viewer may be a fan of three events that are being held at the same time. The viewer could select an event to watch in live mode and select a later button to hold the other events for viewing at another time.

Another embodiment comprises a chess tournament involving multiple players from multiple locations. In one example, each player is from a different location and participates in the contest by broadcasting and receiving live audio and video data. Fans from around the world can view, comment, and/or offer advice on one or many matches simultaneously. In another example, one elite chess player competes against multiple players simultaneously in either the same match or many individual matches.

In another embodiment, skateboarders from around the world upload video clips of their tricks and falls. Viewers, producers, and advertisers use the content to create new production broadcasts. Viewers also vote, recommend, and pass on content to friends and the like. Skateboarders and/or content creators receiving the most votes or notoriety may benefit from product manufacturer and/or advertiser endorsements.

In another embodiment, an ocean yacht race comprises GPS, satellite, and broadband technologies. While a producer on each yacht streams video and GPS information via satellite to a production center, the content is streamed via broadband to a broadcast channel for general viewing. The content is also made available for other producers and news agencies for new content production.

In another embodiment, comprising holographic and surround sound technologies, a live performance of a band in a stadium in London is viewed by millions of viewers around the world. In one example, the live performance is seen in another arena in Los Angeles with holographic images of the band on the main stage and the original audio mix heard through the surround sound system. In another example, viewers watch the band perform in their living room. In another example, clubs around the world sell tickets for a holographic reproduction of the concert. The process 500 allows one performance in one location to be viewed by multiple customers in multiple locations simultaneously. The process 500 also allows the band to expand the earning potential of a singular live performance by charging a fee for each viewer or holographic reproduction.

In another embodiment comprising the search for talent, singers, musicians, comedians, actors, and the like from around the world submit video content auditions. Viewers can vote, pass the content on to friends, use the content to create new broadcasts, and the like. The artists receiving the most votes or notoriety are invited to participate in live talent broadcasts where they will be judged by viewers and expert celebrities in their chosen art form. Winners can receive recording, management, employment, artist contracts, and the like.

In another embodiment singers and bands from around the world, submit videos performances of national anthems. Viewers can vote, pass the content on to friends, use the content to create new broadcasts and the like. Singers and bands receiving the most votes may be invited to perform a national anthem at a live major sporting event. Fans, who may not be interested in sports, can watch a live sporting event broadcast featuring the winning singer or band.

In another embodiment, a radio talk show produces a television talk show comprising broadcast video, web cam, and green screen technologies. Listeners interact with the talk show host via web cams. The low-resolution video stream is edited into the broadcast quality video production and via a green screen, the listeners are placed inside the set of the talk show.

In another embodiment, production content comprised of live performances of bands and artists in garages, bars, clubs, theaters, and the like are edited into other live events such as sporting events, county fairs, political rallies, charity events and the like. The use of green screen technology allows the original live band performance to appear as if it is part of the new event content.

In another embodiment, a viewer interacts with a broadcast by pausing, rewinding, and/or fast forwarding a live media stream within a media player. In one example a father watching his son's live school football game is interrupted by a phone call. The father pauses the live broadcast and takes the phone call. Once the call is over he presses play on the media player and continues watching the game. At any time, he can fast forward to catch up to the actual live events or rewind to view other parts of the game.

In another embodiment, a viewer blocks specific programming comprising of advertising and content. In one example, a parent creates a preference list to block any broadcast that contains violence. The blocking preferences can be turned on or off on the receiving device and can be activated during a live broadcast.

In another embodiment, multiple viewers become commentators in a live sporting event. In one example the commentators comprising of former coaches, athletes, sports administrators and the like are watching a live sporting event and interacting with each other during the broadcast. In another example, the former coaches are watching old highlight reels and sharing thoughts, stories, anecdotes and commentary about the events. In both examples, the actions of the commentators create new content.

In other embodiments, the process 500 is used for interactive auctions, interactive retailers, interactive supermarket, interactive auto sales, bank and finance transactions, interactive search engine, interactive gambling, interactive video gaming, interactive graphics, interactive construction, interactive mining, interactive transport, interactive boardroom, interactive court proceedings, interactive government sessions, interactive human resources, interactive entertainment, interactive telecommunications, interactive market research, interactive interior design, interactive hotels, interactive business to business, interactive communities, interactive veterinary science, interactive sports, interactive product development, interactive talent search, interactive futures, interactive productions, interactive translation, interactive blue screen, interactive health, and the like.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of producing interactive television over the Internet comprising:

receiving over the Internet at at least one server at a production facility a plurality of programming content from different providers, the plurality of programming content received from multiple video cameras positioned at different locations;

receiving at the server over the Internet, from user computers that are remotely located from the production facility, first viewer input from multiple first viewers wherein the multiple first viewers vote on different portions of the programming content received from the multiple video cameras, wherein the first viewer input selects different portions of the programming content received from the multiple video cameras;

combining the different portions of the programming content from the multiple video cameras based at least in part on the first viewer input to create a viewer-customized production that is streamed over the Internet to at least a second viewer; and receiving over the Internet at the server different music from different providers, wherein the different music is composed by the different providers;

adding desired music to the viewer-customized production based on the first viewer input wherein the multiple first viewers vote on different portions of the music to select the desired music from the different music;

receiving over the Internet at the server different audio commentaries about the programming content from different providers, wherein the different audio commentaries represent different points of view;

receiving over the Internet at the server second viewer input from the second viewer that selects a desired commentary from the different audio commentaries;

combining the desired commentary with the viewer-customized production; and transmitting the viewer-customized production with the programming content and desired music selected with the first viewer input and the desired commentary selected by the second viewer input over the Internet to at least the second viewer, wherein advertising is inserted into the viewer-customized production based on at least in part on interests of the second viewer, and based in part on interaction of the second viewer with the viewer-customized production;

tracking usage of items included in the viewer-customized production, the items comprising the programming content and desired music selected with the first viewer input and the desired commentary selected with the second viewer input;

tracking which of the different providers provided the programming content, which of the different providers provided the desired music, which of the different providers provided the desired commentary included in the viewer-customized production; and paying the different providers that provided the programming content, the desired music and the desired commentary based at least in part on the usage in the viewer-customized production a share of revenues associated with the viewer-customized production.

2. The method of claim 1, wherein the first viewer input comprises at least one of a vote, survey results, talent scouting, sharing the viewer-customized production, recommending, critiquing, requesting similar programming, responding to advertising, pausing, rewinding, fast forwarding, blocking, and an Internet Protocol address of the viewer.

3. The method of claim 1, where the programming content comprises at least one of streaming audio, streaming video, and streaming audio/video.

4. The method of claim 1, wherein the items included in the viewer-customized production comprises at least one of: live interaction of multiple feeds, editing, mixing, keying, adding sound effects, adding audio digital replacement (ADR), adding graphics, editing graphics, adding video, editing video, adding audio, editing audio, adding music, adding subtitles, adding animation, adding digital and analog special effects, using computer generated imagery, adding advertisements, creating new commentary, adding text, creating new soundtrack, color grading, compositing, digital compositing performing voice over, using keying technology, and using digital cinema technology.

5. The method of claim 1, further comprising manipulating the viewer-customized production by the second viewer.

6. The method of claim 1, where a production facility manipulates the programming content.

7. The method of claim 1, wherein the second viewer comprises a node of a peer-to-peer network.

8. The method of claim 1, wherein the programming content is related to at least one of interactive auctions, interactive retailers, interactive supermarket, interactive auto sales, bank and finance transactions, interactive search engine, interactive gambling, interactive video gaming, interactive graphics, interactive construction, interactive mining, interactive transport, interactive boardroom, interactive court proceedings, interactive government sessions, interactive human resources, interactive entertainment, interactive telecommunications, interactive market research, interactive interior design, interactive hotels, interactive business to business, interactive communities, interactive veterinary science, interactive sports, interactive product development, interactive talent search, interactive futures, interactive productions, interactive translation, interactive blue screen, interactive education, and interactive health.

9. The method of claim 1, wherein the viewer-customized production includes training or product up selling.

10. An interactive television network comprising:
a plurality of programming content, the plurality of programming content provided by a plurality of content from different providers, the plurality of programming content received from multiple video cameras positioned at different locations;
at least one server at a production facility that receives the plurality of programming content from the Internet, wherein the production facility manipulates the programming content to create a viewer-customized production; first viewer input received from user computers that are remotely located from the production facility, the first viewer input submitted by multiple first viewers over the Internet to the server at the production facility, wherein the multiple first viewers vote on different portions of the programming content received from the multiple video cameras to select different portions of the programming content received from the multiple video cameras;
wherein the multiple first viewers vote on different portions of the music to select desired music from different music from different providers, wherein the different music is composed by the different providers;
different audio commentaries about the programming content from different providers, wherein the different audio commentaries represent different points of view;
second viewer input that selects a desired commentary from the different audio commentaries,
wherein the server is configured to combine the selected different portions of the programming content from the multiple video cameras and the desired music based on the first viewer input with the desired commentary based on the second viewer input , and wherein the viewer-customized production is viewed over the Internet by at least the second viewer;
wherein the server is further configured to track usage of items included in the viewer-customized production, the items comprising the programming content and music selected with the first viewer input, and the desired commentary selected with the second viewer input;
wherein the server is further configured to track which of the different providers provided the programming content, which of the different providers provided the desired commentary, and which of the different providers provided the desired music included in the viewer-customized production; and
wherein the server is further configured to pay the different providers that provided the programming content, the desired music and the desired commentary a share of revenues associated with the viewer-customized production.

11. The network of claim 10, wherein the first viewer input comprises at least one of a vote, survey results, talent scouting, sharing the customized production, recommending, critiquing, requesting similar programming, responding to advertising, pausing, rewinding, fast forwarding, blocking, and an Internet Protocol address of the viewer.

12. The network of claim 10, where the programming content comprises at least one of streaming audio, streaming video, and streaming audio/video.

13. The network of claim 10, wherein the items included in the viewer-customized production comprises at least one of: live interaction of multiple feeds, editing, mixing, keying, adding sound effects, adding audio digital replacement (ADR), adding graphics, editing graphics, adding video, editing video, adding audio, editing audio, adding music, adding subtitles, adding animation, adding digital and analog special effects, using computer generated imagery, adding advertisements, creating new commentary, adding text, creating new soundtrack, color grading, compositing, digital compositing, performing voice over, using keying technology, and using digital cinema technology.

14. The network of claim 10, wherein the second viewer comprises the production facility.

15. The network of claim 10, wherein at least one of the content providers comprises the production facility.

16. The network of claim 10, wherein the viewer-customized production includes training or product up selling.

* * * * *